US012525899B2

(12) United States Patent
Shirouchi et al.

(10) Patent No.: US 12,525,899 B2
(45) Date of Patent: Jan. 13, 2026

(54) POWER CONVERSION DEVICE AND AIRCRAFT EQUIPPED WITH POWER CONVERSION DEVICE

(71) Applicant: Mitsubishi Electric Corporation, Tokyo (JP)

(72) Inventors: Yusuke Shirouchi, Tokyo (JP); Ryota Asakura, Tokyo (JP); Kenji Fujiwara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 179 days.

(21) Appl. No.: 18/683,512

(22) PCT Filed: Sep. 3, 2021

(86) PCT No.: PCT/JP2021/032433
§ 371 (c)(1),
(2) Date: Feb. 14, 2024

(87) PCT Pub. No.: WO2023/032150
PCT Pub. Date: Mar. 9, 2023

(65) Prior Publication Data
US 2024/0356460 A1 Oct. 24, 2024

(51) Int. Cl.
*H02M 7/5395* (2006.01)
*H02M 1/00* (2006.01)
(Continued)

(52) U.S. Cl.
CPC ....... *H02M 7/5395* (2013.01); *H02M 1/0095* (2021.05); *H02M 1/123* (2021.05);
(Continued)

(58) Field of Classification Search
CPC .. H02M 7/5395; H02M 1/385; H02M 7/4835; H02M 1/123; H02M 1/0095; H02M 1/44
See application file for complete search history.

(56) References Cited

U.S. PATENT DOCUMENTS 11,804,788 B2* 10/2023 Kojima ................ H02M 1/325
2011/0089765 A1  4/2011 Iwata et al.
(Continued)

FOREIGN PATENT DOCUMENTS

JP   2006-081362 A   3/2006
JP   2006-109688 A   4/2006
(Continued)

OTHER PUBLICATIONS

International Search Report and Written Opinion mailed on Nov. 16, 2021, received for PCT Application PCT/JP2021/032433, filed on Sep. 3, 2021, 11 pages including English Translation.

*Primary Examiner* — Adolf D Berhane
(74) *Attorney, Agent, or Firm* — XSENSUS LLP

(57) ABSTRACT

A power conversion device which converts power from a power supply and supplies the converted power to a load, includes: a first inverter including first capacitors and a plurality of switching elements; a second inverter including a plurality of switching elements, and second capacitors to which voltages smaller than voltages of the first capacitors are applied; and a control device. The control device performs control with dead times applied to the plurality of switching elements, and performs control so that a voltage variation width of combined voltage of output voltage of the first inverter and output voltage of the second inverter during a dead time period is reduced.

12 Claims, 19 Drawing Sheets

(51) Int. Cl.
    *H02M 1/12*           (2006.01)
    *H02M 1/38*           (2007.01)
    *H02M 1/44*           (2007.01)
    *H02M 7/483*         (2007.01)

(52) U.S. Cl.
    CPC ............ *H02M 1/385* (2021.05); *H02M 1/44* (2013.01); *H02M 7/4835* (2021.05)

(56) References Cited

U.S. PATENT DOCUMENTS

| | | | |
|---|---|---|---|
| 2022/0131476 A1* | 4/2022 | Sugahara | H02M 7/4835 |
| 2023/0216431 A1* | 7/2023 | Shirouchi | H02M 1/32 |
| 2024/0063730 A1* | 2/2024 | Fujiwara | H02M 7/003 |
| 2025/0202384 A1* | 6/2025 | Asakura | H02M 1/0058 |

FOREIGN PATENT DOCUMENTS

| | | |
|---|---|---|
| JP | 2010-035252 A | 2/2010 |
| WO | 2009/116273 A1 | 9/2009 |
| WO | 2020/166003 A1 | 8/2020 |
| WO | 2021/166164 A1 | 8/2021 |

\* cited by examiner

INVERTER OUTPUT PHASE VOLTAGE
COMMAND VALUE (U PHASE)

THREE-PHASE THREE-LEVEL INVERTER OUTPUT
PHASE VOLTAGE COMMAND VALUE (U PHASE)

SINGLE-PHASE INVERTER OUTPUT PHASE
VOLTAGE COMMAND VALUE (U PHASE)

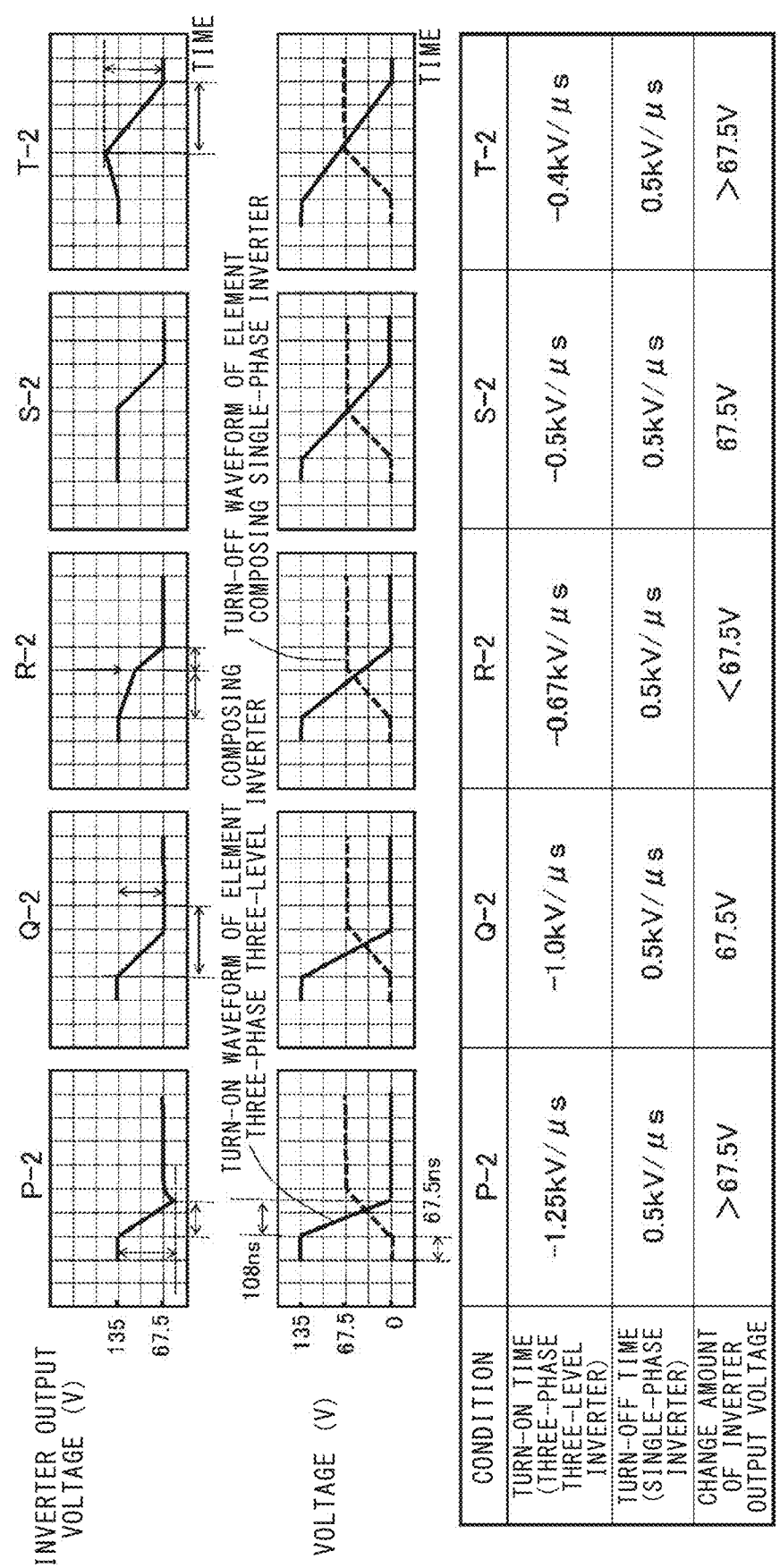

POWER CONVERSION DEVICE AND AIRCRAFT EQUIPPED WITH POWER CONVERSION DEVICE

CROSS-REFERENCE TO RELATED APPLICATION

This application is based on PCT filing PCT/JP2021/032433, filed Sep. 3, 2021, the entire contents of which are incorporated herein by reference.

TECHNICAL FIELD

The present disclosure relates to a power conversion device and an aircraft equipped with the power conversion device.

BACKGROUND ART

In recent years, development for electrification has been advancing along with movement for reducing $CO_2$ in aircrafts in terms of environmental problems. A power conversion device used in an electric aircraft is required to have a reduced weight and high reliability. For example, if failure is caused by erroneous operation due to the influence of electromagnetic noise, reliability is lost. Meanwhile, if a filter for suppressing electromagnetic noise is used for increasing reliability, the weight of the device increases, leading to reduction in fuel efficiency of the aircraft. Therefore, it is required that electromagnetic noise generated from the power conversion device is suppressed, reliability is ensured, and the weight of the filter is reduced. Thus, in the electric aircraft, not only weight reduction of the power conversion device body but also weight reduction of a passive component serving as a noise filter is required. Then, it is found that, for weight reduction of such a passive component, it is necessary to reduce electric noise outputted from an inverter body forming the power conversion device.

In this regard, the applicant has disclosed that, in a power conversion device including a three-phase inverter and three single-phase inverters connected to the three-phase inverter, control is performed so that common-mode voltage is kept within a predetermined allowable range and the change width of each line voltage in combined output voltages satisfies a prescribed condition based on DC voltage of the single-phase inverter, thus suppressing both of common-mode noise and normal-mode noise (see, for example, Patent Document 1).

CITATION LIST

Patent Document

Patent Document 1: WO2020/166003

SUMMARY OF THE INVENTION

Problem to be Solved by the Invention

Meanwhile, it is also important to prevent short-circuit between legs in the power conversion device used in the electric aircraft. Therefore, inverter operation control is performed with a short-circuit prevention period (dead time) applied for preventing short-circuit. However, in a case of applying a dead time, an operation path changes, and common-mode voltage and a voltage variation width are increased, which can lead to noise generation.

The present disclosure has been made to solve the above problem, and an object of the present disclosure is to provide a power conversion device that enables noise reduction even in a case of applying a dead time, and provide an aircraft equipped with the power conversion device.

Means to Solve the Problem

A power conversion device according to the present disclosure is a power conversion device which is provided between a power supply and a load and which converts power from the power supply and supplies the converted power to the load, the power conversion device including: a first inverter including a first capacitor and a plurality of switching elements; a second inverter connected in series to the first inverter, and including a plurality of switching elements, and a second capacitor to which voltage smaller than voltage applied to the first capacitor is applied; and a control device which generates driving signals for driving the plurality of switching elements of the first inverter and the plurality of switching elements of the second inverter. The control device performs control with dead times applied to the plurality of switching elements of the first inverter and the plurality of switching elements of the second inverter, and controls a variation timing of output voltage of the first inverter and a variation timing of output voltage of the second inverter so that a voltage variation width of combined voltage of the output voltage of the first inverter and the output voltage of the second inverter during a dead time period is reduced.

Effect of the Invention

In the power conversion device according to the present disclosure, the variation timing of the output voltage of the first inverter and the variation timing of the output voltage of the second inverter are controlled so that the voltage variation width of the combined voltage of the output voltage of the first inverter and the output voltage of the second inverter during the dead time period is reduced. Thus, great voltage change and voltage distortion of line voltage and common-mode voltage during the dead time period can be reduced. That is, short-circuit can be prevented and noise can be suppressed, so that it becomes possible to reduce the size and the weight of the filter connected at the stage subsequent to the inverter.

BRIEF DESCRIPTION OF THE DRAWINGS

FIG. 11B shows the relationship of turn-off waveforms, turn-on waveforms, and output voltage waveforms of the semiconductor elements composing the power conversion device according to embodiment 3.

DESCRIPTION OF EMBODIMENTS

Figure 1:
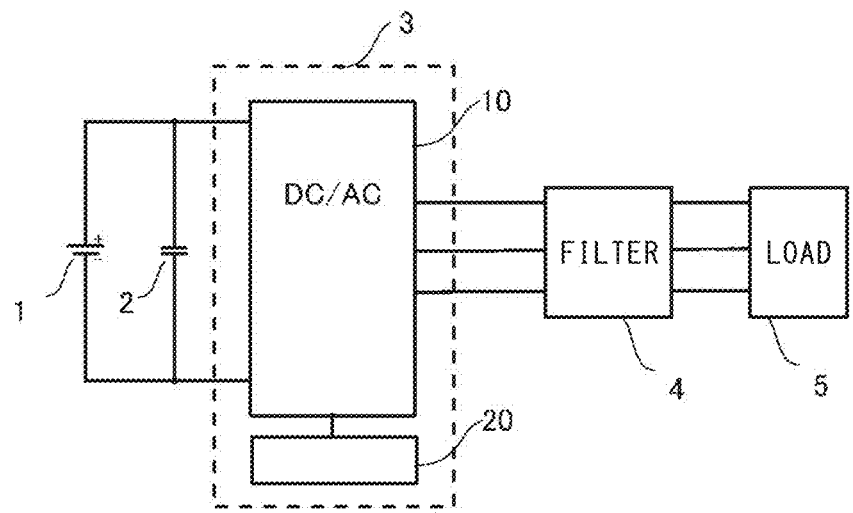
FIG. 1 is a schematic configuration diagram showing a configuration of a power conversion system according to embodiment 1.

Hereinafter, embodiments will be described with reference to the drawings. In the drawings, the same reference characters denote the same or corresponding parts.

Embodiment 1

Hereinafter, a power conversion device according to embodiment 1 will be described with reference to the drawings.

FIG. 1 is a schematic configuration diagram showing an example of a power conversion system in which a power conversion device 3 according to embodiment 1 is used. In FIG. 1, the power conversion device 3 and a filter 4 are connected in series between a DC power supply 1 and a load 5 (e.g., a motor in FIG. 2), and a DC link capacitor 2 is connected in parallel between the DC power supply 1 and the power conversion device 3. The power conversion device 3 includes an inverter 10 which is a power conversion unit for converting power from the DC power supply 1 to predetermined power and outputting the predetermined power to the load 5 via the filter 4, and a control device 20 which is a control unit therefor. In the present embodiment 1, a case where the inverter 10 is a DC/AC inverter will be described as an example.

Figure 2:
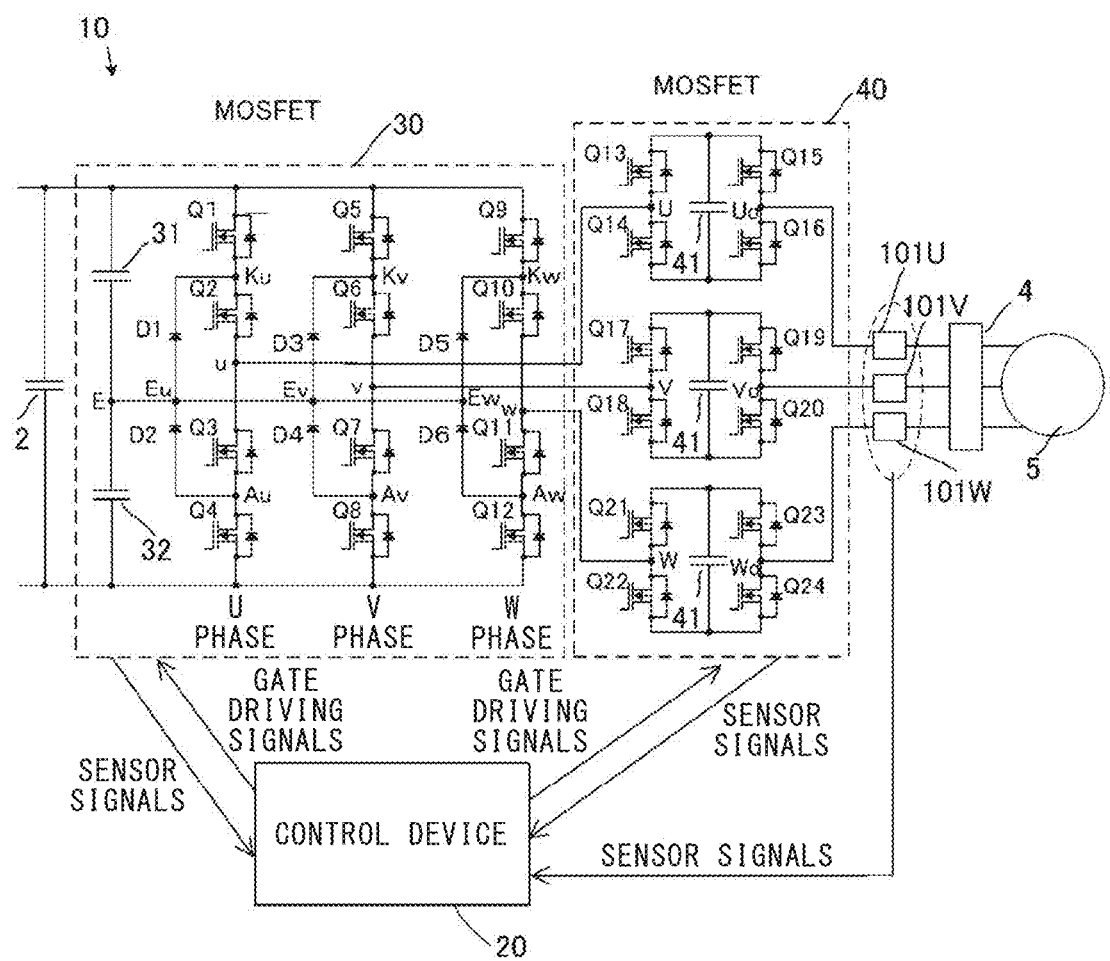
FIG. 2 shows an example of a circuit configuration of a power conversion device according to embodiment 1.

FIG. 2 shows an example of a circuit configuration of the inverter 10. The DC/AC inverter includes a three-phase three-level inverter 30 which is a first inverter for performing conversion from DC to AC, and a single-phase inverter device 40 which is a second inverter for performing conversion to predetermined power. The single-phase inverter device 40 includes three single-phase inverters corresponding to three phases. In FIG. 2, switching elements Q1 to Q12 composing the three-phase three-level inverter 30 each have a structure in which a diode is connected in antiparallel to a metal-oxide-semiconductor field-effect transistors (MOSFET) which is a semiconductor element, and switching elements Q13 to Q24 composing the single-phase inverter device 40 each have a structure in which a diode is connected in antiparallel to a MOSFET which is a semiconductor element, as an example.

Here, preferably, the switching elements Q1 to Q12 composing the three-phase three-level inverter 30 and the switching elements Q13 to Q24 composing the single-phase inverter device 40 are each formed using a wide bandgap semiconductor. As described later in detail, in particular, the switching elements Q13 to Q24 composing the single-phase inverter device 40 are subjected to high-speed switching and therefore it is more preferable to form these switching elements using a wide bandgap semiconductor.

The structure of each of the switching elements Q1 to Q24 composing the three-phase three-level inverter 30 and the single-phase inverter device 40 in FIG. 2 will be described with reference to FIG. 3.

Figure 3:
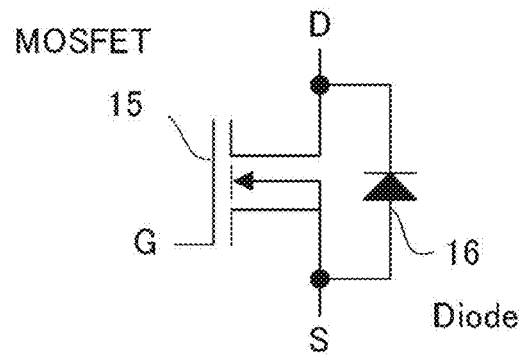
FIG. 3 shows an example of a switching element used in the power conversion device according to embodiment 1.

FIG. 3 shows an example of the configuration of a semiconductor element applied to the switching elements Q1 to Q12 composing the three-phase three-level inverter 30 and the switching elements Q13 to Q24 composing the single-phase inverter device 40. The semiconductor element is composed of a MOSFET 15 having a drain terminal D, a gate terminal G, and a source terminal S, and a diode 16 connected in antiparallel thereto. The MOSFET 15 may be a Si-MOSFET, or, for example, a SiC-MOSFET using a wide bandgap semiconductor. The diode 16 may be a Si-diode, or, for example, a SiC-diode using a wide bandgap semiconductor. However, a semiconductor element using a wide bandgap semiconductor is desirable.

Next, the circuit configuration of the inverter 10 will be described with reference to FIG. 2. In FIG. 2, the three-phase three-level inverter 30 is formed such that a P-side capacitor 31 and an N-side capacitor 32 connected in series, switching elements Q1 to Q4 connected in series, switching elements Q5 to Q8 connected in series, and switching elements Q9 to Q12 connected in series, are connected in parallel to the DC link capacitor 2.

A connection point E between the P-side capacitor 31 and the N-side capacitor 32 is connected to a connection point Eu between an anode terminal of a diode D1 and a cathode terminal of a diode D2, a connection point Ev between an anode terminal of a diode D3 and a cathode terminal of a diode D4, and a connection point Ew between an anode terminal of a diode D5 and a cathode terminal of a diode D6.

A cathode terminal of the diode D1 is connected to a connection point Ku between the switching element Q1 and the switching element Q2, a cathode terminal of the diode D3 is connected to a connection point Kv between the switching element Q5 and the switching element Q6, and a cathode terminal of the diode D5 is connected to a connection point Kw between the switching element Q9 and the switching element Q10.

An anode terminal of the diode D2 is connected to a connection point Au between the switching element Q3 and the switching element Q4, an anode terminal of the diode D4 is connected to a connection point Av between the switching element Q7 and the switching element Q8, and an anode terminal of the diode D6 is connected to a connection point Aw between the switching element Q11 and the switching element Q12.

A connection point u between the switching element Q2 and the switching element Q3, a connection point v between the switching element Q6 and the switching element Q7, and a connection point w between the switching element Q10 and the switching element Q11, are connected to the single-phase inverter device 40.

The switching elements Q1 to Q4 connected in series form a leg for U phase, the switching elements Q5 to Q8 connected in series form a leg for V phase, and the switching elements Q9 to Q12 connected in series form a leg for W phase.

The single-phase inverter device 40 is formed by a bridge circuit of four switching elements corresponding to each phase. That is, the single-phase inverter device 40 includes a U-phase inverter in which the switching element Q13 and the switching element Q14 connected in series, the switching element Q15 and the switching element Q16, connected in series, and a capacitor 41, are connected in parallel, a V-phase inverter in which the switching element Q17 and the switching element Q18 connected in series, the switching element Q19 and the switching element Q20 connected in series, and a capacitor 41, are connected in parallel, and a W-phase inverter in which the switching element Q21 and the switching element Q22 connected in series, the switching element Q23 and the switching element Q24 connected in series, and a capacitor 41, are connected in parallel.

A connection point U between the switching element Q13 and the switching element Q14 is connected to the connection point u of the three-phase three-level inverter 30, a connection point V between the switching element Q17 and the switching element Q18 is connected to the connection point v of the three-phase three-level inverter 30, and a connection point W between the switching element Q21 and the switching element Q22 is connected to the connection point w of the three-phase three-level inverter 30.

A connection point Uo between the switching element Q15 and the switching element Q16, a connection point Vo between the switching element Q19 and the switching element Q20, and a connection point Wo between the switching element Q23 and the switching element Q24, are connected to the filter 4.

The control device 20 receives sensor signals from current sensors 101U, 101V, 101W for respective phases provided on the output side of the single-phase inverter device 40, voltage sensors (not shown) provided for the P-side capacitor 31 and the N-side capacitor 32 which are input capacitors of the three-phase three-level inverter 30, and voltage sensors (not shown) provided for the capacitors 41 of the single-phase inverter device 40, and outputs gate driving signals to the switching elements Q1 to Q24 included in the three-phase three-level inverter 30 and the single-phase inverter device 40, to perform control for conversion to predetermined power. Current sensors may be provided also to the three-phase three-level inverter 30.

Figure 4A:
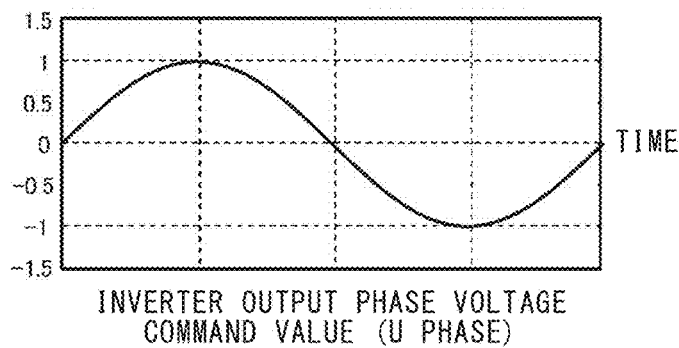
FIG. 4A shows an output command value in the power conversion device according to embodiment 1.
Figure 4B:
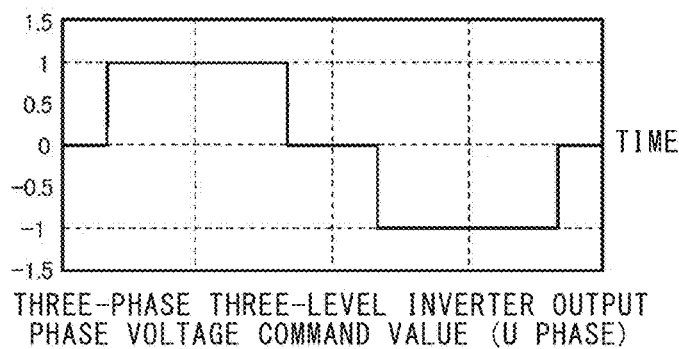
FIG. 4B shows an output command value for a three-phase three-level inverter in the power conversion device according to embodiment 1.
Figure 4C:
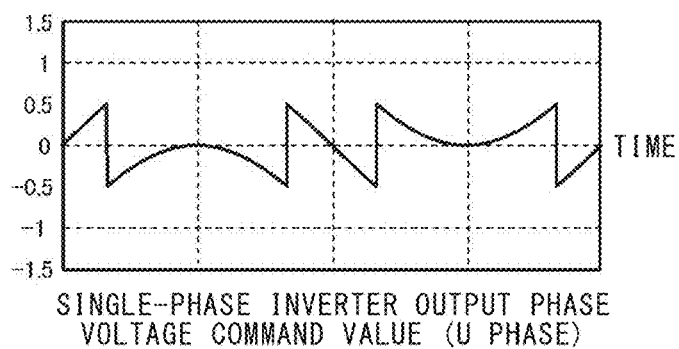
FIG. 4C shows an output command value for a single-phase inverter device in the power conversion device according to embodiment 1.

Next, operation of the power conversion device 3 according to embodiment 1 will be described. FIG. 4A shows an output voltage command value as a target for output voltage from the inverter 10, and here shows an example for U phase. The output waveform is a sinewave as shown in the graph. FIG. 4B shows an output voltage command value (U phase) for the three-phase three-level inverter 30, and the output waveform is a 1-pulse rectangular wave. FIG. 4C shows an output voltage command value (U phase) for the single-phase inverter device 40, and this has a waveform corresponding to a difference between the target output waveform in FIG. 4A and the output voltage command value for the three-phase three-level inverter 30 in FIG. 4B.

By gate driving signals from the control device 20, the three-phase three-level inverter 30 and the single-phase inverter device 40 output voltages in accordance with the respective output voltage command values having predetermined waveforms. The three-phase three-level inverter 30 produces a 1-pulse waveform through low-frequency switching operation, and the single-phase inverter device 40 produces a voltage waveform with a shape of multiple pulses because the output voltage command value has a waveform produced through pulse width modulation (PWM). Therefore, setting is made such that the voltages of the capacitors 41 of the single-phase inverter device 40 are smaller than the voltages of the P-side capacitor 31 and the N-side capacitor 32 which are input capacitors of the three-phase three-level inverter 30. For example, if the former voltage is set to be ½ of the latter voltage, it is possible to output a stable waveform with less harmonic components through PWM operation of the single-phase inverter device 40.

The control device 20 calculates the gate driving signals using the sensor signals from the above voltage sensors (not shown) and the current sensors 101U, 101V, 101W provided at the stage subsequent to the single-phase inverter device 40, so as to keep the relationship of the voltage ratio of the capacitors, and outputs the gate driving signals to the switching elements Q1 to Q24. Thus, the three-phase three-level inverter 30 produces a 1-pulse waveform through low-frequency switching operation at high DC voltage, and the single-phase inverter device 40 performs high-speed switching operation at low DC voltage.

Figure 5A:
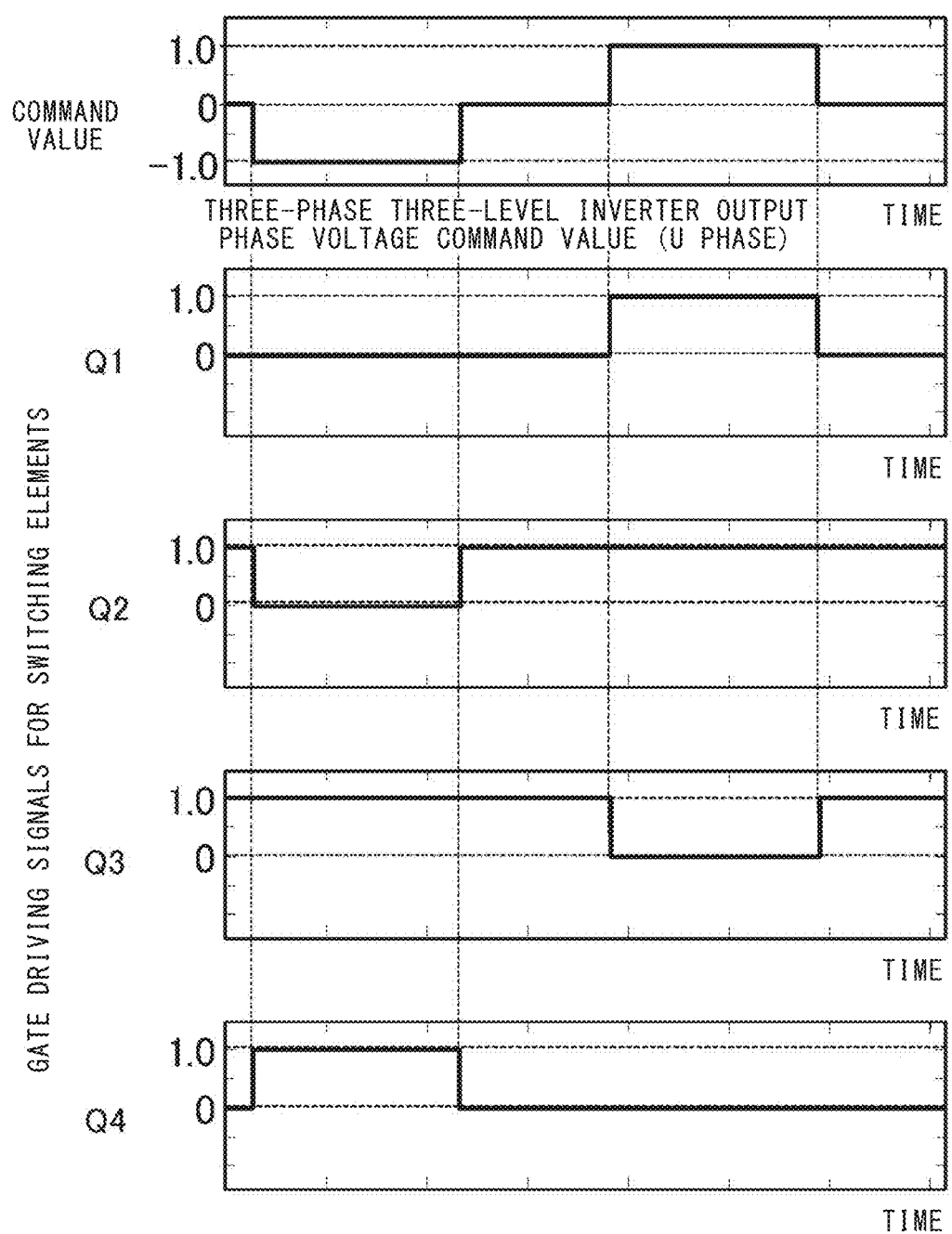
FIG. 5A shows gate driving signals for driving switching elements composing the three-phase three-level inverter in the power conversion device according to embodiment 1.

FIG. 5A shows ideal gate driving signals outputted to the switching elements in order to output a voltage waveform corresponding to the output voltage command value (U phase) for the three-phase three-level inverter 30. In FIG. 5A, from the top, a waveform of the output voltage command value (U phase) for the three-phase three-level inverter 30 and waveforms of the gate driving signals for driving the switching elements Q1 to Q4 forming the leg for U phase of the three-phase three-level inverter 30, are shown. Each of the switching elements Q1 to Q4 is switched on once and off once per cycle. In this case, the applied voltage between the drain and the source of the semiconductor element has a voltage value (Vdc/2) of the P-side capacitor 31 or the N-side capacitor 32 which is an input capacitor, during a period in which the gate driving signal is OFF (i.e., 0), and has a voltage value of 0 during a period in which the gate driving signal is ON (i.e., 1) (actually has a value corresponding to internal voltage reduction).

Figure 5B:
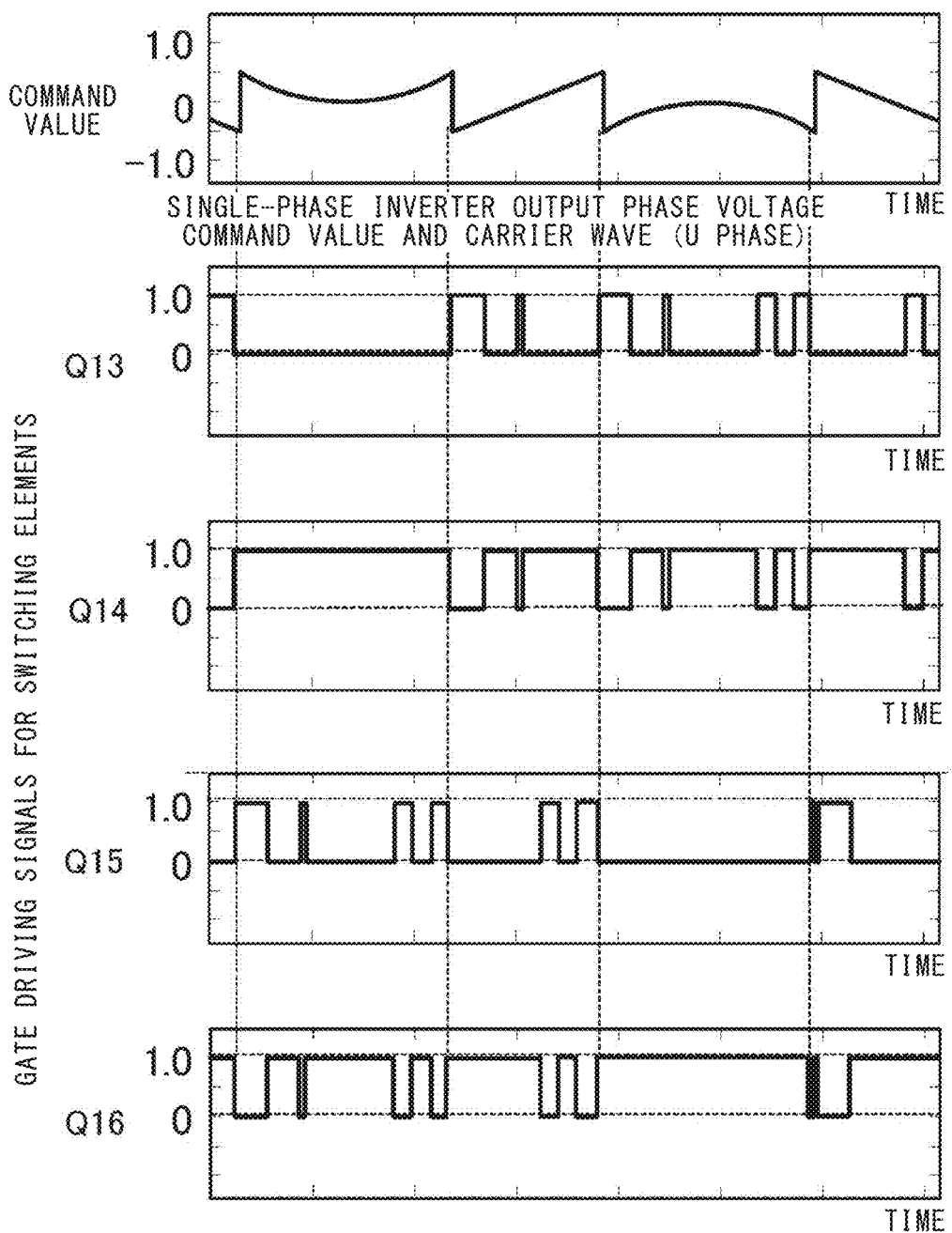
FIG. 5B shows gate driving signals for driving switching elements composing the single-phase inverter device in the power conversion device according to embodiment 1.

FIG. 5B shows gate driving signals outputted to the switching elements in order to output a voltage waveform corresponding to the output voltage command value (U phase) for the single-phase inverter device 40. In FIG. 5B, from the top, a waveform of the output voltage command value for the single-phase inverter device 40 and a carrier wave (U phase), and waveforms of the gate driving signals for driving the switching elements Q13 to Q16 composing the inverter for U phase of the single-phase inverter device 40, are shown. Each of the switching elements Q13 to Q16 is switched on plural times and off plural times per cycle. Since the switching elements composing the single-phase inverter device 40 which performs PWM operation are subjected to a large number of times of switching, semiconductor elements such as SiC-MOSFETs which are small in switching loss and suitable for high-frequency driving, are desirably used. In this case, the applied voltage between the drain and the source of the semiconductor element has a voltage value of the capacitor 41 during a period in which the gate driving signal is OFF (i.e., 0), and has a voltage value of 0 during a period in which the gate driving signal is ON (i.e., 1) (actually has a value corresponding to internal voltage reduction).

In a case where the voltages of the capacitors 41 of the single-phase inverter device 40 are set to be, for example, ½ of the voltages of the P-side capacitor 31 and the N-side capacitor 32 which are input capacitors of the three-phase three-level inverter 30 so that the former voltage is smaller than the latter voltage, voltages applied to the switching elements composing the single-phase inverter device 40 are ½ of voltages applied to the switching elements composing the three-phase three-level inverter 30. Such a configuration is applicable even in a case other than a three-phase power conversion device.

Figure 6:
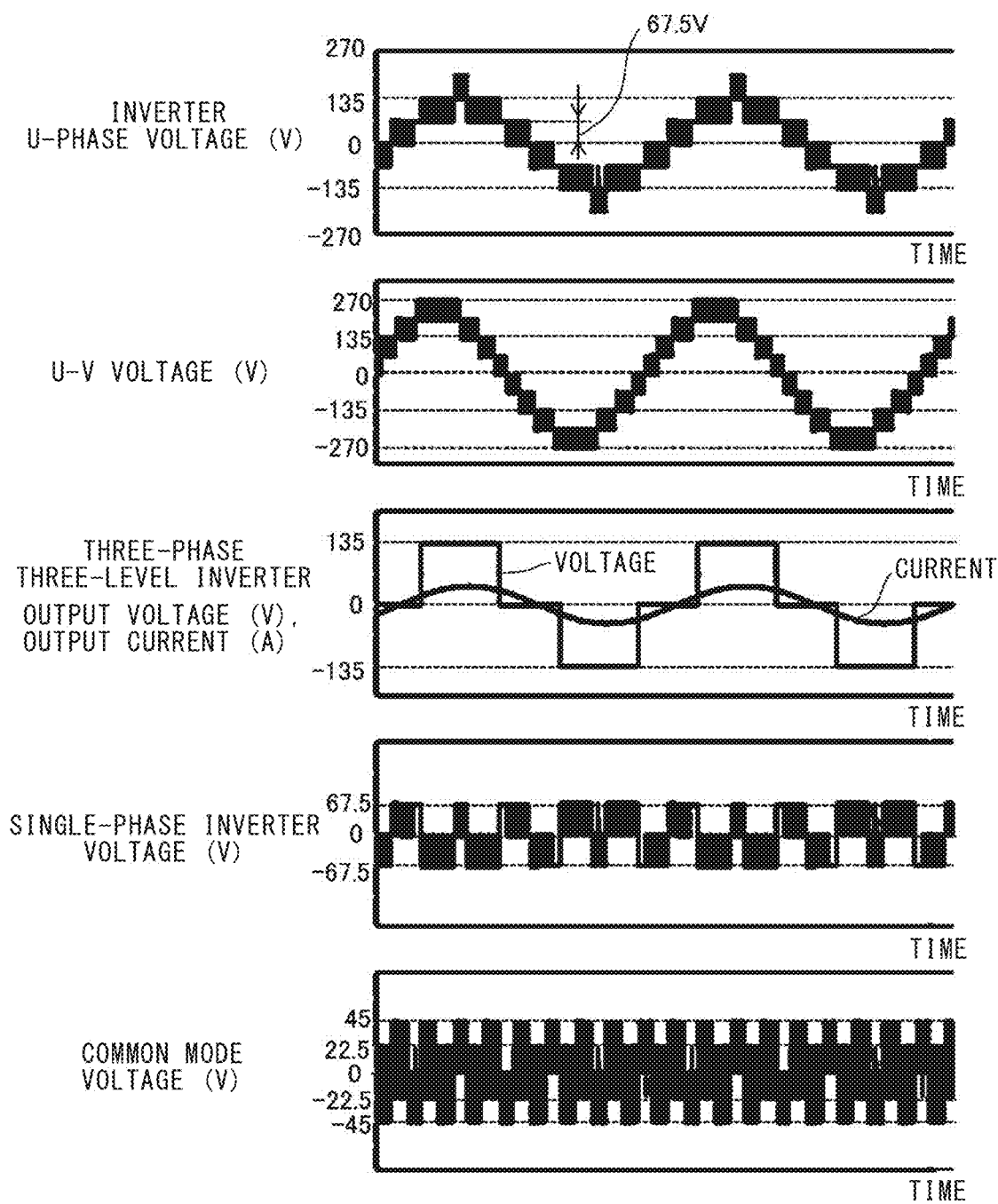
FIG. 6 shows output voltages when the three-phase three-level inverter is driven with the waveforms shown in FIG. 5A and when the single-phase inverter is driven with the waveforms shown in FIG. 5B.

FIG. 6 shows an example of output waveforms when the switching elements Q1 to Q4 of the three-phase three-level inverter 30 are driven with the waveforms shown in FIG. 5A and the switching elements Q13 to Q16 of the single-phase inverter device 40 are driven with the waveforms shown in FIG. 5B. In FIG. 6, from the top, a waveform of output voltage for U phase of the inverter 10 (combined voltage obtained by superimposing output voltage for U phase of the single-phase inverter device 40 on U-phase output voltage of the three-phase three-level inverter 30), a waveform of output voltage between U phase and V phase of the inverter 10 (line voltage between U-phase combined voltage obtained by superimposing output voltage for U phase of the single-phase inverter device 40 on U-phase output voltage of the three-phase three-level inverter 30 and V-phase combined voltage obtained by superimposing output voltage for V phase of the single-phase inverter device 40 on V-phase output voltage of the three-phase three-level inverter 30), waveforms of U-phase voltage and U-phase current of the three-phase three-level inverter 30, a waveform of U-phase voltage of the single-phase inverter device 40, and a waveform of common-mode voltage of the inverter 10, are shown.

In FIG. 6, regarding the output voltage for U phase of the inverter 10 and the output voltage between U phase and V phase of the inverter 10 shown at two stages from the top, a voltage change amount per 1 step of each output voltage is defined as corresponding to 1 level. In this case, 1 level corresponds to a voltage value applied to each capacitor 41 composing the single-phase inverter device 40. For example, in a case where voltages (Vdc/2) applied to the P-side capacitor 31 and the N-side capacitor 32 of the three-phase three-level inverter 30 are each 135 V, voltage applied to each capacitor 41 is 67.5 V, which corresponds to 1 level.

The common-mode voltage of the inverter 10 is calculated by dividing the sum of phase voltages for respective phases by the number of the phases. For example, in the configurations of the three-phase three-level inverter 30 and the single-phase inverter device 40, where U-phase voltage is denoted by Vu, V-phase voltage is denoted by Vv, and W-phase voltage is denoted by Vw, common-mode voltage Vcom can be represented by the following Expression (1).

$$Vcom = (Vu + Vv + Vw)/3 \qquad (1)$$

A voltage change amount per 1 step of the common-mode voltage corresponds to a value obtained by dividing voltage (here, 67.5 V) applied to the capacitor 41 composing the single-phase inverter device 40 by 3 (67.5/3=22.5 (V)).

Next, a short-circuit prevention period (dead time: Td) will be described.

The dead time is a period in which upper and lower switches are both set to be OFF so that they do not become ON at the same time at an ON-OFF switching timing, in order to prevent short-circuit between upper and lower arms. It is known that the dead time is applied in a case of operating the power conversion device in an actual machine. However, due to the dead time applied for preventing short-circuit, an unintentional operation path might be produced, so that voltage variations of the output waveform and the common mode waveform increase and the waveforms are distorted, thus influencing noise and surge voltage.

Figure 7A:
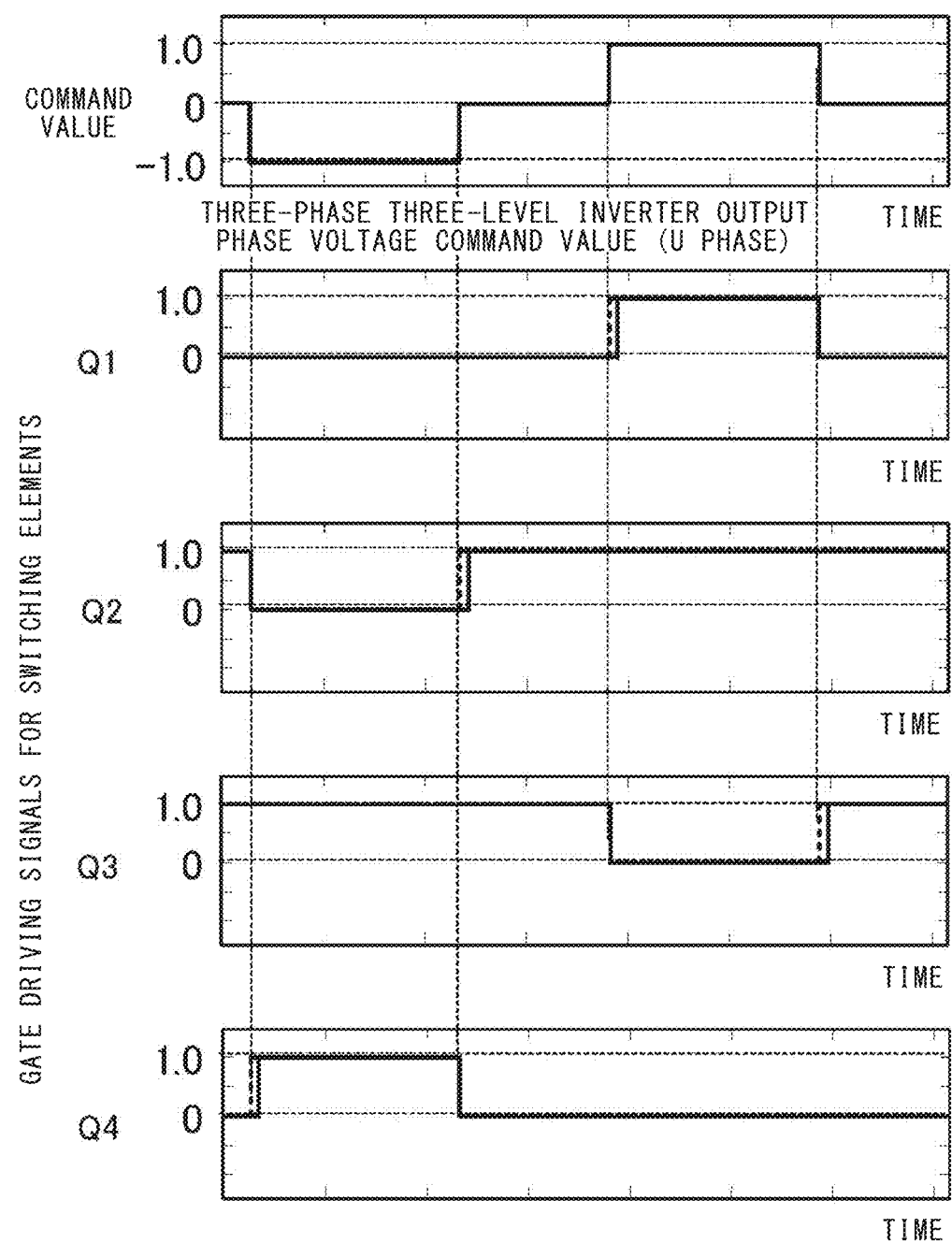
FIG. 7A shows gate driving signals obtained by performing dead time correction on the gate driving signals shown in FIG. 5A.
Figure 7B:
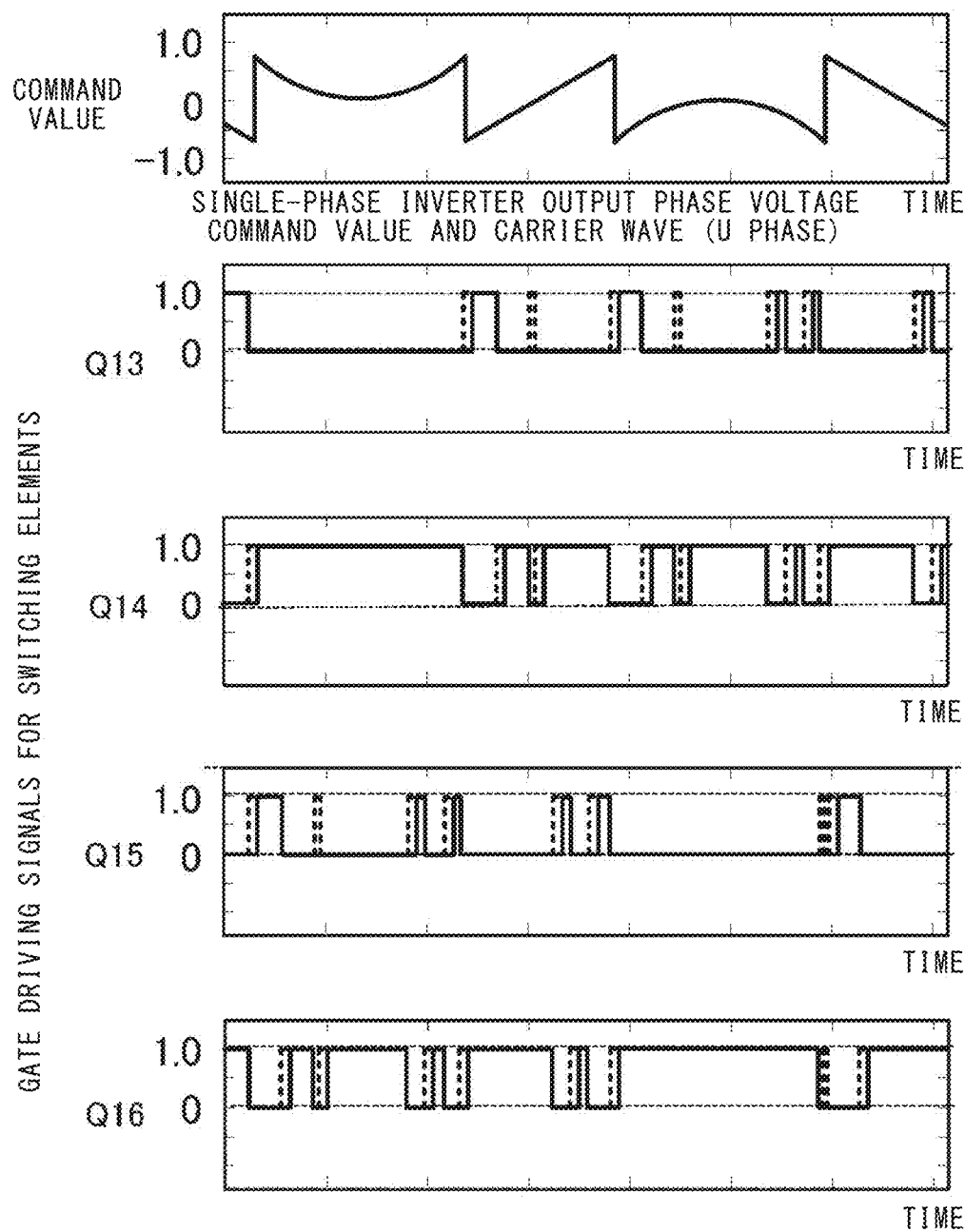
FIG. 7B shows gate driving signals obtained by performing dead time correction on the gate driving signals shown in FIG. 5B.

FIG. 7A and FIG. 7B show gate driving signals when the dead time is applied to the gate driving signals for the switching elements shown in FIG. 5A and FIG. 5B. FIG. 7A shows waveforms in a case where the dead time is applied to the gate driving signals outputted to the switching elements in order to output a voltage waveform corresponding to the output voltage command value (U phase) for the three-phase three-level inverter 30.

In FIG. 7A, from the top, a waveform of the output voltage command value (U phase) for the three-phase three-level inverter 30 and waveforms of the gate driving signals for driving the switching elements Q1 to Q4 forming the leg for U phase of the three-phase three-level inverter 30, are shown. For the switching elements Q1 to Q4, broken lines indicate operations before the dead time is applied (operations in FIG. 5A).

Here, the dead time is provided at the time of rising of the gate voltage, as an example. However, the dead time may be provided at falling or at both of rising and falling. A dead time period is applied for every switching. For example, in a case of providing a dead time period of 1 μs, a pattern in which 1 μs is provided at rising or falling or a pattern in which 0.5 μs is provided at rising and 0.5 μs is provided at falling, is assumed. In this case, as in FIG. 5A, the applied voltage between the drain and the source of the semiconductor element has a voltage value of the P-side capacitor 31 or the N-side capacitor 32 which is an input capacitor during a period in which the gate driving signal is OFF (i.e., 0), and has a voltage value of 0 during a period in which the gate driving signal is ON (i.e., 1) (actually has a value corresponding to internal voltage reduction).

FIG. 7B shows waveforms in a case where the dead time is applied to the gate driving signals outputted to the switching elements in order to output a voltage waveform corresponding to the output voltage command value (U phase) for the single-phase inverter device 40. In FIG. 7B, from the top, a waveform of the output voltage command value for the single-phase inverter device 40 and a carrier wave (U phase), and waveforms of signals before the dead time is applied (shown by broken lines) and waveforms of driving signals when the dead time is applied (shown by solid lines) for the switching elements Q13 to Q16 composing the inverter for U phase of the single-phase inverter device 40, are shown.

As in the case of the three-phase three-level inverter 30, the dead time is provided at the time of rising of the gate voltage. However, the dead time may be provided at falling or at both of rising and falling. In the single-phase inverter device 40, the dead time is applied for every switching.

The switching elements Q13 to Q16 are switched on plural times and off plural times per cycle. As in the case of not applying the dead time, since the switching elements composing the single-phase inverter device 40 which performs PWM operation are subjected to a large number of times of switching, semiconductor elements such as SiC-MOSFETs which are small in switching loss and suitable for high-frequency driving, are desirably used. In this case, the applied voltage between the drain and the source of the semiconductor element has a voltage value of the capacitor 41 during a period in which the gate driving signal is OFF (i.e., 0), and has a voltage value of 0 during a period in which the gate driving signal is ON (i.e., 1) (actually has a value corresponding to internal voltage reduction).

In a case where the voltages of the capacitors 41 of the single-phase inverter device 40 are set to be, for example, ½ of the voltages of the P-side capacitor 31 and the N-side capacitor 32 which are input capacitors of the three-phase three-level inverter 30 so that the former voltage is smaller than the latter voltage, voltages applied to the switching elements composing the single-phase inverter device 40 are ½ of voltages applied to the switching elements composing the three-phase three-level inverter 30. In this case, 1 level of voltage outputted from the inverter 10 corresponds to voltage applied to the element composing the single-phase inverter device 40. Such a configuration is applicable even in a case other than a three-phase power conversion device.

Figure 8A:
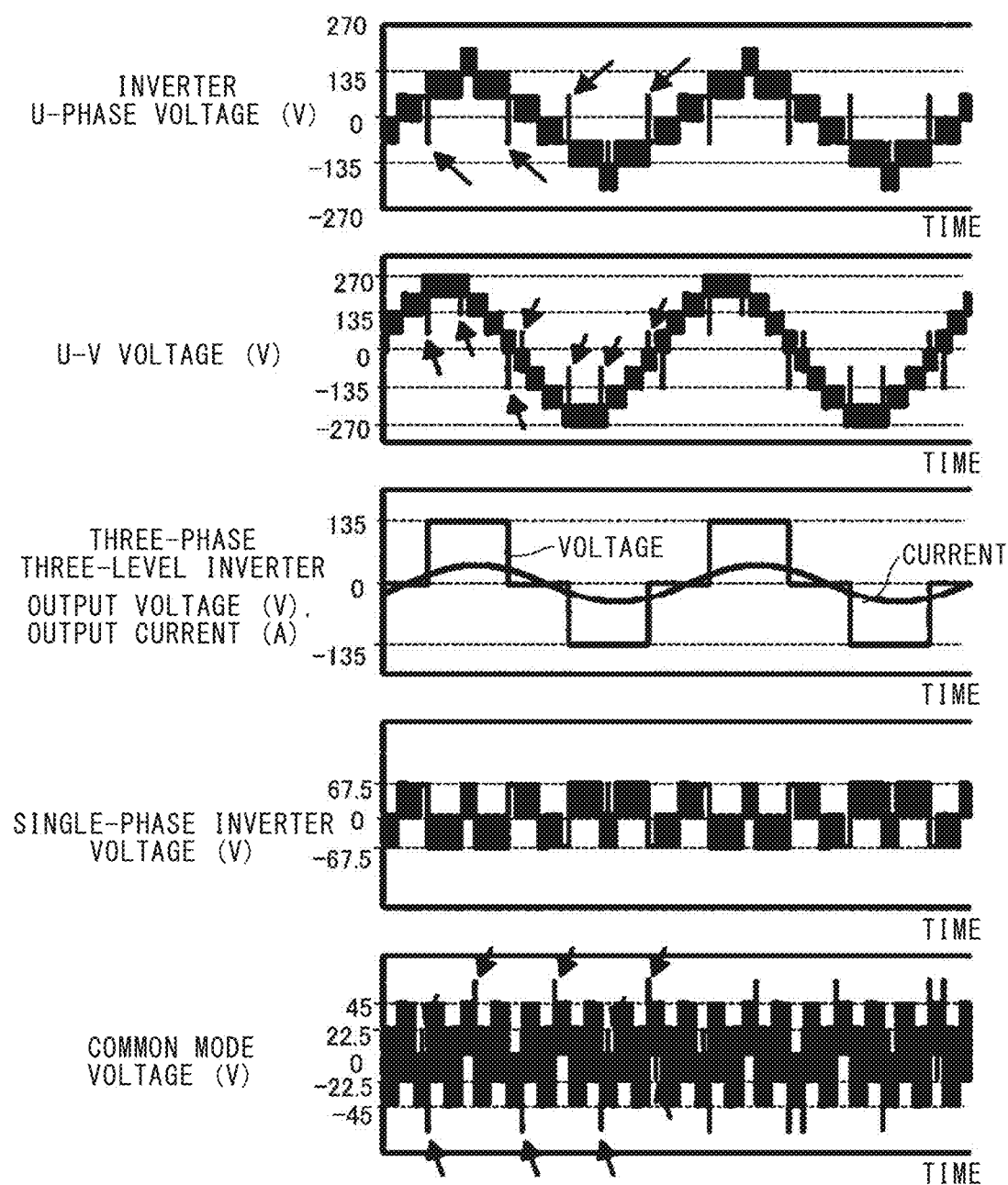
FIG. 8A shows output voltages when the three-phase three-level inverter is driven with the waveforms shown in FIG. 7A and when the single-phase inverter is driven with the waveforms shown in FIG. 7B.
Figure 8B:
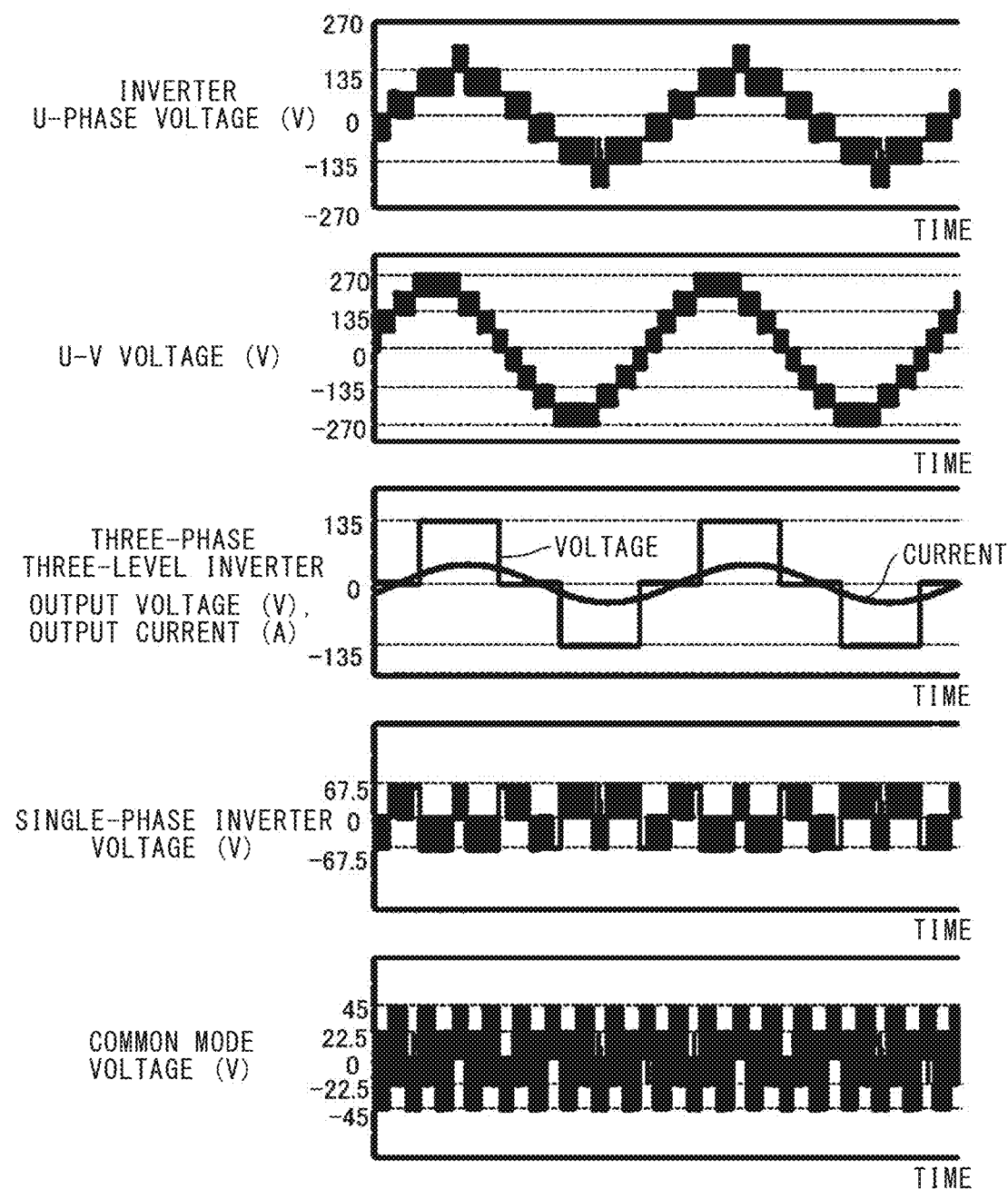
FIG. 8B shows output voltages when the three-phase three-level inverter is driven with the waveforms shown in FIG. 7A, the single-phase inverter device is driven with the waveforms shown in FIG. 7B, and correction control is performed.

In FIG. 8A and FIG. 8B, from the top, a waveform of output voltage for U phase of the inverter 10 (combined voltage obtained by superimposing output voltage for U phase of the single-phase inverter device 40 on U-phase output voltage of the three-phase three-level inverter 30), a waveform of output voltage between U phase and V phase of the inverter 10 (line voltage between U-phase combined voltage obtained by superimposing output voltage for U phase of the single-phase inverter device 40 on U-phase output voltage of the three-phase three-level inverter 30 and V-phase combined voltage obtained by superimposing output voltage for V phase of the single-phase inverter device 40 on V-phase output voltage of the three-phase three-level inverter 30), waveforms of U-phase voltage and U-phase current of the three-phase three-level inverter 30, a waveform of U-phase voltage of the single-phase inverter device 40, and a waveform of common-mode voltage of the inverter 10, are shown.

FIG. 8A shows examples of output waveforms when the switching elements Q1 to Q4 of the three-phase three-level inverter 30 are driven with the waveforms shown in FIG. 7A and the switching elements Q13 to Q16 of the single-phase inverter device 40 are driven with the waveforms shown in FIG. 7B, and corresponds to a case where the dead time is applied to FIG. 6.

Comparing FIG. 8A and FIG. 6, it is found that, in FIG. 8A in which the dead time is applied, as indicated by arrows, there are points where a voltage change amount per 1 step during each dead time period of the output voltage for U phase of the inverter 10 and output voltage between U phase and V phase of the inverter 10 exceeds 1 level and reaches an amount corresponding to about 2 levels. The 1 level in this case corresponds to a voltage value applied to each capacitor 41 composing the single-phase inverter device 40, as described above. For example, in a case where voltages applied to the P-side capacitor 31 and the N-side capacitor 32 are each 135 V, voltage applied to each capacitor 41 is 67.5 V, and voltage variations corresponding to 2 levels or more occur at arrow parts in FIG. 8A.

Such thin-pulse-shaped voltage is called a voltage spike, and occurrence of the voltage spike is due to change in the operation path as a result of application of the dead time. Such voltage having a variation width over 2 levels per 1 step influences noise. Therefore, a noise filter needs to be provided for suppressing noise. Further, as the voltage variation width increases, the noise filter has a greater size and a greater weight.

FIG. 8B shows a result when control is performed so that voltage spikes shown in FIG. 8A will not occur.

Hereinafter, a method for performing control so that voltage spikes will not occur will be described.

Figure 9A:
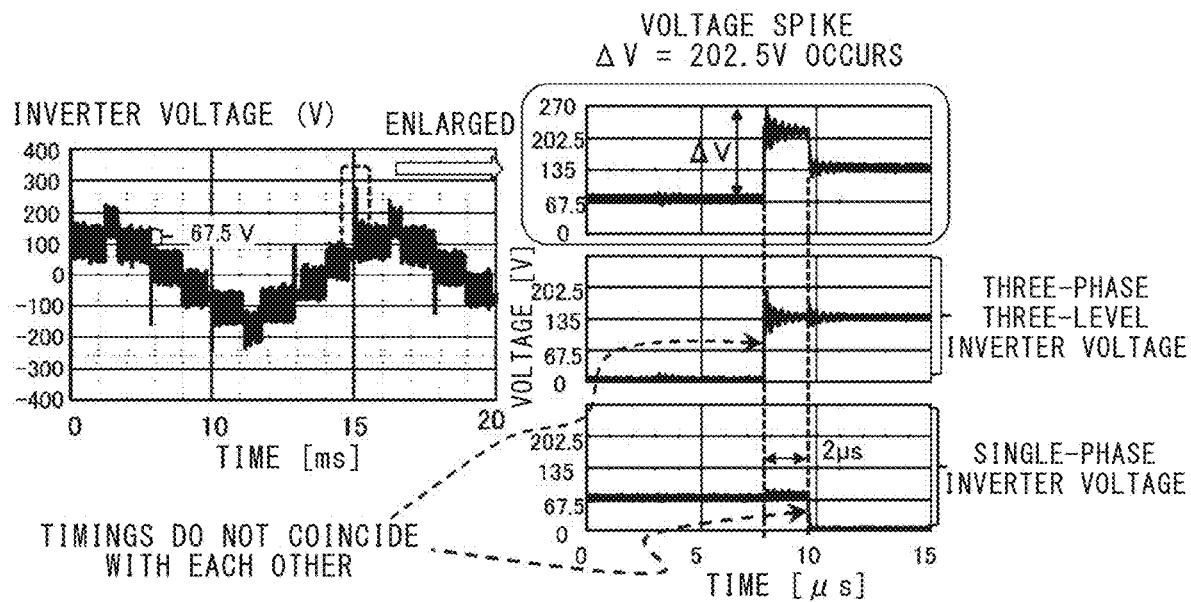
FIG. 9A illustrates a generation mechanism of a voltage pulse in the waveform shown in FIG. 8A.

FIG. 9A illustrates a cause for occurrence of voltage spikes shown in FIG. 8A. A part of the output voltage for U phase of the inverter 10 at the uppermost stage in FIG. 8A is shown in an enlarged manner. At a part where voltage spike ΔV corresponds to 3 levels (202.5 V), timings of voltage variations in a case where the dead time is applied do not coincide with each other between the output voltage waveform of the three-phase three-level inverter and the output voltage waveform of the single-phase inverter. In FIG. 9A, it is recognized that the output voltage of the single-phase inverter falls with a delay of 2 μs from rising of the output voltage of the three-phase three-level inverter. This difference is considered to occur due to shift by the dead time and delay of a gate circuit. Accordingly, in the present embodiment, the variation timings of the output voltages of the three-phase three-level inverter 30 and the single-phase inverter 40 are adjusted so that the voltage variation width of combined voltage of the output voltage of the three-phase three-level inverter 30 and the output voltage of the single-phase inverter 40 is reduced. Specifically, both timings are controlled so as to coincide with each other so that shift does not occur. For example, the variation timing of one voltage may be shifted by an amount of the dead time, or the variation timing of one voltage may be shifted by a total amount of the dead time and circuit delay.

Figure 9B:
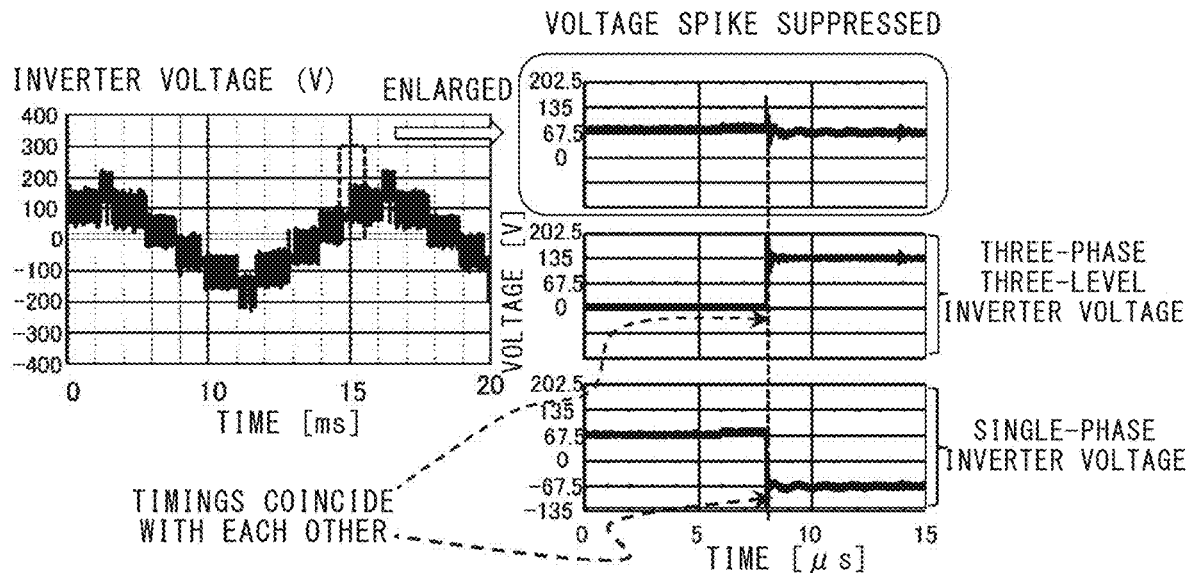
FIG. 9B illustrates correction control for removing the voltage pulse from the waveform shown in FIG. 8A.

FIG. 9B shows an example in which the variation timing of voltage generated by the single-phase inverter device 40 is advanced so that the variation timing of voltage generated by the three-phase three-level inverter 30 and the variation timing of voltage generated by the single-phase inverter device 40 coincide with each other. The method for making the timings coincide with each other is not limited thereto. The timings may be adjusted by advancing or delaying the timing of voltage generated by the three-phase three-level inverter 30 or by advancing or delaying the timing of voltage generated by the single-phase inverter device 40.

FIG. 8B shows output voltages in a case where the variation timing of voltage generated by the three-phase three-level inverter 30 and the variation timing of voltage generated by the single-phase inverter device 40 are controlled so as to coincide with each other, to suppress occurrence of voltage spikes. As compared to FIG. 8A, it is found that, by controlling the variation timing of voltage generated by the three-phase three-level inverter 30 and the variation timing of voltage generated by the single-phase inverter device 40 so as to coincide with each other, voltage variation during the dead time period of the output voltage for U phase of the inverter 10 and output voltage between U phase and V phase of the inverter 10 can be kept within 1 level per 1 step. Also in the common-mode voltage of the inverter 10, the voltage variation amount per 1 step during a dead time period can be kept within 1 level.

As described above, according to embodiment 1, during a dead time period set for preventing short-circuit in the inverter 10, the variation timing of output voltage of the three-phase three-level inverter 30 which is a first inverter and the variation timing of the output voltage of the single-phase inverter device 40 which is a second inverter are controlled in the power conversion device 3, whereby great voltage change and voltage distortion occurring in the output voltage, the line voltage, and the common-mode voltage of the inverter 10 can be reduced. Thus, a short-circuit prevention function is provided, noise due to voltage variation and voltage distortion can be reduced, and the filter connected at the stage subsequent to the inverter 10 can be reduced in size and weight. Then, the change width of the output voltage of the inverter 10 which is combined voltage of the output voltage of the three-phase three-level inverter 30 and the output voltage of the single-phase inverter device 40 is controlled to be within 1 level per 1 step, whereby voltage spikes can be suppressed and the noise reduction effect can be assuredly obtained.

In embodiment 1, it is possible to satisfy the condition in which common-mode noise and normal-mode noise can be reduced as described in Patent Document 1. That is, in the example of embodiment 1, the maximum value of common-mode voltage corresponds to a value obtained by dividing voltage (here, 135 V) applied to each of the P-side capacitor 31 and the N-side capacitor 32 composing the three-phase three-level inverter 30 by 3 (135/3=45 (V)). By setting voltages of the capacitors 31, 32, 41 of the inverter 10 as described above, it becomes possible to provide the short-circuit prevention function while suppressing occurrence of noise, even in a condition in which both of common-mode noise and normal-mode noise can be reduced.

The power conversion device 3 according to the present embodiment 1 includes the inverter 10 including the three-phase three-level inverter 30 and the single-phase inverter device 40, and the control device 20 which performs drive control of the inverter 10, high-withstand-voltage semiconductor elements are used for the switching elements composing the three-phase three-level inverter 30, semiconductor elements made of a wide bandgap semiconductor are used for the switching elements composing the single-phase inverter device 40, and the timings of variation of voltage generated by the three-phase three-level inverter 30 and variation of voltage generated by the single-phase inverter device 40 are made to coincide with each other. Thus, it is possible to provide a high-efficiency power conversion device in which loss due to driving of the switching elements is also reduced, while providing the above effects.

In a case where the power conversion device 3 according to embodiment 1 as described above is mounted to an aircraft, the noise filter can be reduced in size and weight, thus contributing to fuel efficiency improvement. In addition, the influence of noise is suppressed without weight increase, whereby reliability is also improved.

Embodiment 2

Hereinafter, a power conversion device according to embodiment 2 will be described with reference to the drawings. In embodiment 1, it has been described that the variation timing of voltage generated by the three-phase three-level inverter 30 and the variation timing of voltage generated by the single-phase inverter device 40 during a dead time period are controlled so as to coincide with each other, whereas in the present embodiment 2, a control method according to the polarity of load current which changes depending on the state of the load 5 will be described.

Figure 10A:
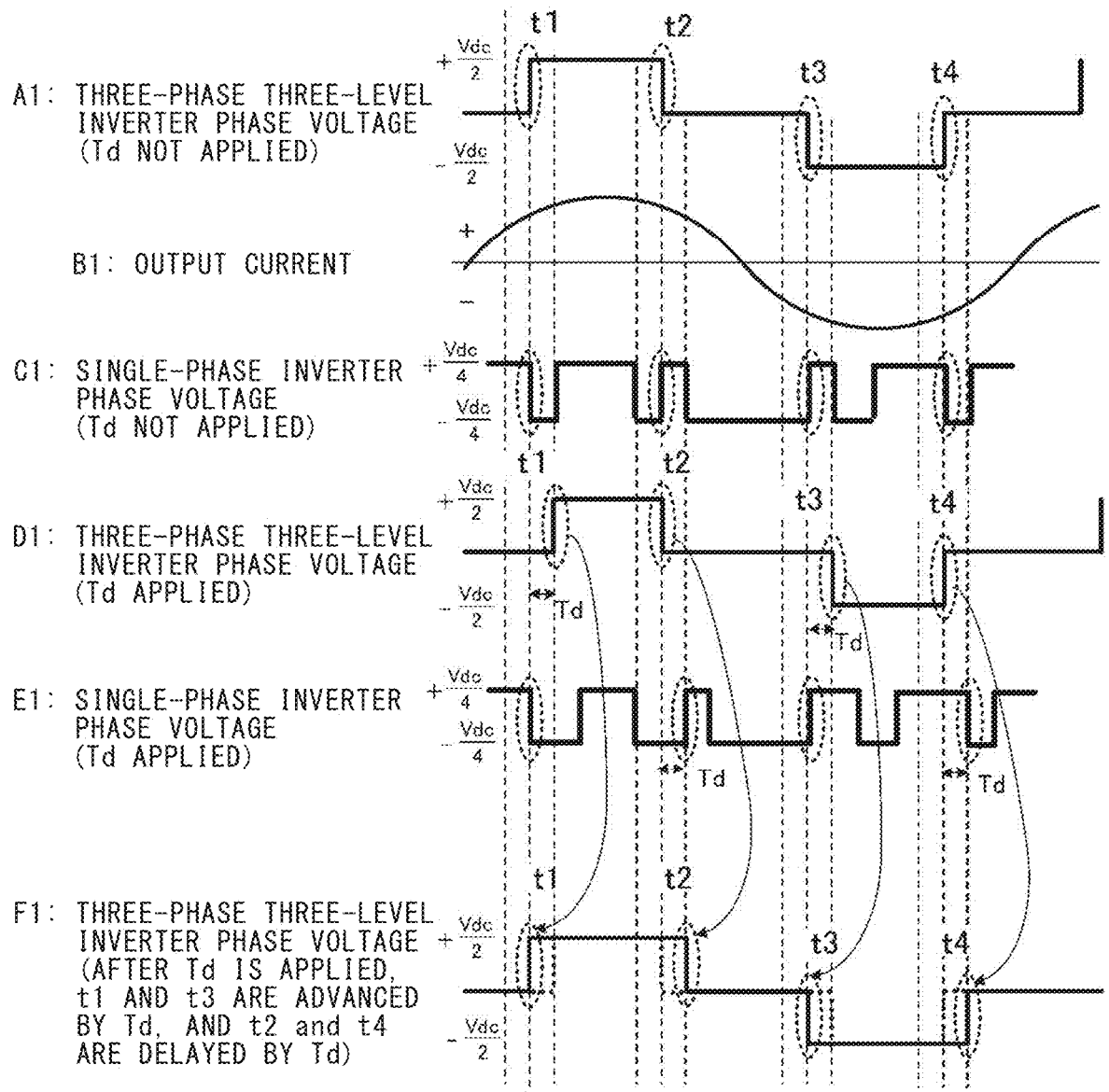
FIG. 10A illustrates the influence of dead time application and an improvement method therefor, in a case where a load power factor is 1, in a power conversion device according to embodiment 2.
Figure 10B:
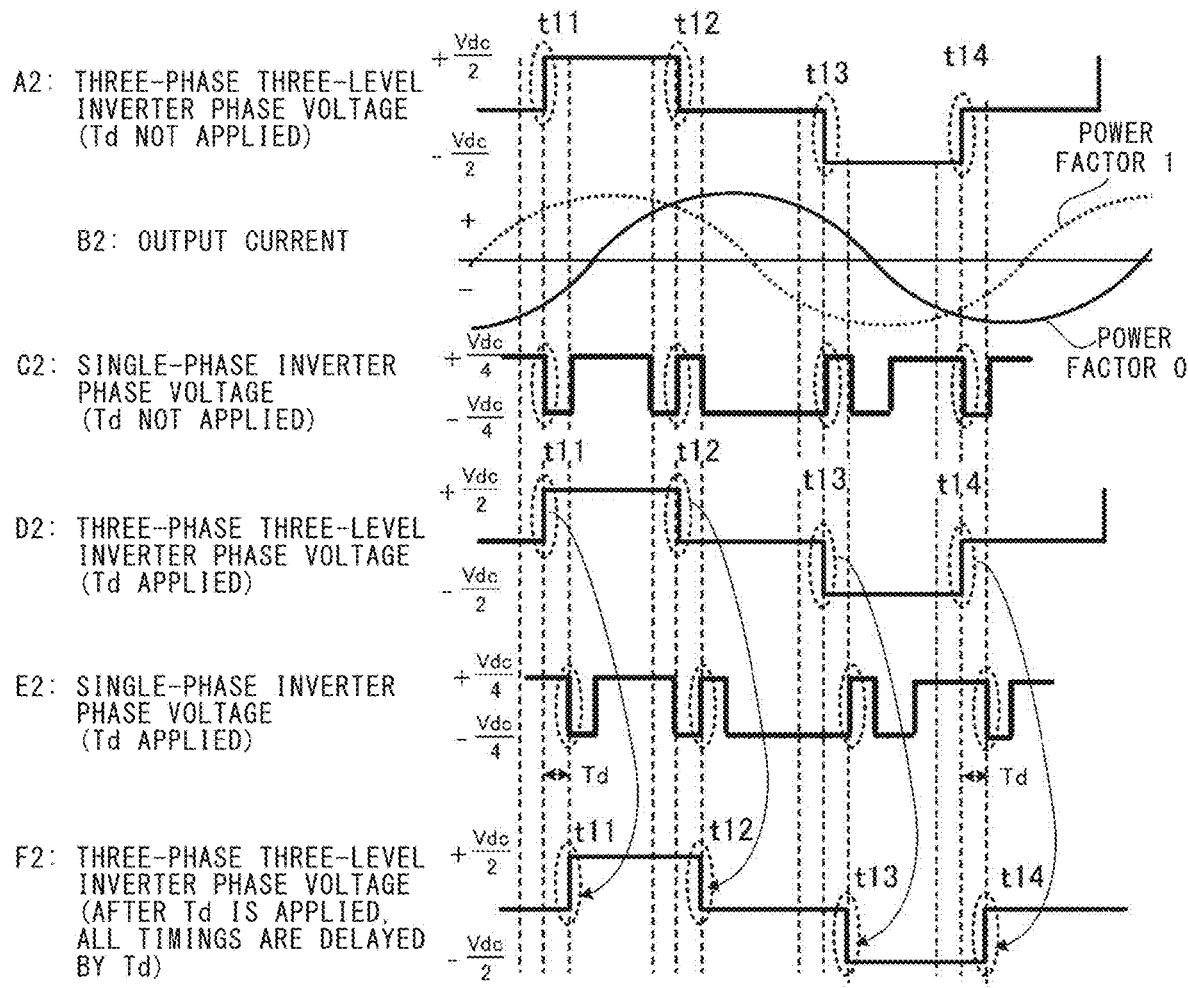
FIG. 10B illustrates the influence of dead time application and an improvement method therefor, in a case where the load power factor is 0, in the power conversion device according to embodiment 2.

FIG. 10A and FIG. 10B show waveforms of phase voltage of the three-phase three-level inverter 30, phase voltage of the single-phase inverter device 40, and current, under different states of the load 5.

FIG. 10A shows a case where the load power factor is 1. From the top, an output voltage waveform (A1) of phase voltage (e.g., U phase) of the three-phase three-level inverter 30 with the dead time not applied, current detected by the current sensor 101U for U phase on output current (B1) of the inverter 10, an output voltage waveform (C1) of phase voltage (for the same phase as that of the three-phase three-level inverter 30) of the single-phase inverter device 40 with the dead time not applied, an output voltage waveform (D1) of phase voltage of the three-phase three-level inverter 30 with the dead time applied, an output voltage waveform (E1) of phase voltage of the single-phase inverter device 40 with the dead time applied, and an output voltage waveform (F1) of phase voltage of the three-phase three-level inverter 30 in a case where the timing of voltage variation is controlled from the waveform D1, are shown. Hereinafter, the above waveforms will be described while being simply referred to as waveforms A1, etc.

First, regarding the waveform B1, the current direction from the inverter toward the load is defined as positive.

In the waveform A1, when the positive-side voltage rises from 0 to +Vdc/2 (t1) and when the positive-side voltage falls from +Vdc/2 to 0 (t2), the polarity of the output current (B1) is positive. When the negative-side voltage rises from 0 to −Vdc/2 (t3) and when the negative-side voltage falls from −Vdc/2 to 0 (t4), the polarity of the output current is negative. As is found from the waveform C1, the timings t1 to t4 shown in the waveform A1 are timings when the output voltage of phase voltage of the single-phase inverter device 40 also varies.

Under the condition where the load power factor is 1, when the dead times are applied to the switching elements of the three-phase three-level inverter 30 and the switching elements of the single-phase inverter device 40, the waveform D1 and the waveform E1 are obtained, respectively. In the waveform D1, as compared to the waveform A1, the rising timings t1, t3 are delayed by Td but the falling timings t2, t4 are not delayed. This is because, due to the polarity of the load current, current flows via the diode provided to the switching element during the dead time period, and thus delay does not occur. In the waveform E1, as compared to the waveform C1, the timing t1 at which the voltage changes from +Vdc/4 to −Vdc/4 when the polarity of the load current is positive is not delayed, but the timing t2 at which the voltage changes from −Vdc/4 to +Vdc/4 when the polarity of the load current is positive is delayed by Td. In addition, the timing t3 at which the voltage changes from −Vdc/4 to +Vdc/4 when the polarity of the load current is negative is not delayed, but the timing t4 at which the voltage changes from +Vdc/4 to −Vdc/4 when the polarity of the load current is negative is delayed by Td. Also regarding the timings t1, t3, for the same reason, current flows via the diode provided to the switching element due to the polarity of the load current, and thus delay does not occur.

As a result, comparing the waveform D1 and the waveform E1, the timing of variation of the output voltage of the three-phase three-level inverter 30 and the timing of variation of the output voltage of the single-phase inverter device 40 do not coincide with each other at all the timings t1 to t4. Therefore, in order to suppress occurrence of voltage spikes, both variation timings are controlled so as to coincide with each other.

The waveform F1 is a waveform obtained when the timing of variation of the output voltage of the three-phase three-level inverter 30 and the timing of variation of the output voltage of the single-phase inverter device 40 are controlled so as to coincide with each other at the timings t1 to t4. In the waveform F1, with respect to the output voltage of the three-phase three-level inverter 30, the timing t1 at which the positive-side voltage rises from 0 to +Vdc/2 and the timing t3 at which the negative-side voltage rises from 0 to −Vdc/2 are advanced by Td, and the timing t2 at which the positive-side voltage falls from +Vdc/2 to 0 and the timing t4 at which the negative-side voltage falls from −Vdc/2 to 0 are delayed by Td.

The control method for making the timings coincide with each other is not limited thereto. With respect to the output voltage of the single-phase inverter device 40, the timings t1, t3 may be delayed by Td and the timings t2, t4 may be advanced by Td. Further, control for advancing or delaying the timings of the output voltage of the three-phase three-level inverter 30 and control for advancing or delaying the timings of the output voltage of the single-phase inverter device 40, may be combined.

FIG. 10B shows a case where the load power factor is 0. From the top, an output voltage waveform (A2) of phase voltage (e.g., U phase) of the three-phase three-level inverter 30 with the dead time not applied is shown, and current detected by the current sensor 101U for U phase on output current (B2) of the inverter 10 is shown by a solid line (a dotted line shows output current in a case where the power factor is 1). Subsequently, an output voltage waveform (C2) of phase voltage (for the same phase as that of the three-phase three-level inverter 30) of the single-phase inverter device 40 with the dead time not applied, an output voltage waveform (D2) of phase voltage of the three-phase three-level inverter 30 with the dead time applied, an output voltage waveform (E2) of phase voltage of the single-phase inverter device 40 with the dead time applied, and an output voltage waveform (F2) of phase voltage of the three-phase three-level inverter 30 in a case where the timing of voltage variation is controlled from the waveform D2, are shown.

As described in FIG. 10A, regarding the waveform B2 (shown by the solid line for a power factor of 0) in FIG. 10B, the current direction from the inverter toward the load is defined as positive.

In the waveform A2, when the positive-side voltage rises from 0 to +Vdc/2 (t11) and when the negative-side voltage falls from −Vdc/2 to 0 (t14), the polarity of the output current (B2) is negative. When the positive-side voltage falls from +Vdc/2 to 0 (t12) and when the negative-side voltage rises from 0 to −Vdc/2 (t13), the polarity of the output current (B2) is positive. As is found from the waveform C2, the timings t11 to t14 shown in the waveform A2 are timings when the output voltage of phase voltage of the single-phase inverter device 40 also varies.

Under the condition where the load power factor is 0, when the dead times are applied to the switching elements of the three-phase three-level inverter 30 and the switching elements of the single-phase inverter device 40, the waveform D2 and the waveform E2 are obtained, respectively. In the waveform D2, as compared to the waveform A2, the rising timing t11 of the positive-side voltage, the falling timing t12 of the positive-side voltage, the rising timing t13 of the negative-side voltage, and the falling timing t14 of the negative-side voltage, are not delayed. This is because, due to the polarity of the load current, current flows via the diode provided to the switching element during the dead time period, and thus delay does not occur. In the waveform E2, as compared to the waveform C2, the timing t11 at which the voltage changes from +Vdc/4 to −Vdc/4 when the polarity of the load current is negative, the timing t12 at which the voltage changes from −Vdc/4 to +Vdc/4 when the polarity of the load current is positive, the timing t13 at which the voltage changes from −Vdc/4 to +Vdc/4 when the polarity of the load current is positive, and the timing t14 at which the voltage changes from +Vdc/4 to −Vdc/4 when the polarity of the load current is negative, are all delayed by Td.

As a result, comparing the waveform D2 and the waveform E2, the timing of variation of the output voltage of the three-phase three-level inverter 30 and the timing of variation of the output voltage of the single-phase inverter device 40 do not coincide with each other at all the timings t11 to t14. Therefore, in order to suppress occurrence of voltage spikes, both variation timings are controlled so as to coincide with each other.

The waveform F2 is a waveform obtained when the timing of variation of the output voltage of the three-phase three-level inverter 30 and the timing of variation of the output voltage of the single-phase inverter device 40 are controlled so as to coincide with each other at the timings t11 to t14. In the waveform F2, with respect to the output voltage of the three-phase three-level inverter 30, the timings t11, t12, t13, t14 are delayed by Td as indicated by arrows.

The control method for making the timings coincide with each other is not limited thereto. With respect to the output voltage of the single-phase inverter device 40, the timings t11, t12, t13, t14 may be advanced by Td. Further, control for advancing or delaying the timings of the output voltage of the three-phase three-level inverter 30 and control for advancing or delaying the timings of the output voltage of the single-phase inverter device 40, may be combined.

Although the cases where the load power factor is 1 and 0 have been shown in the above description, also in cases of other power factors depending on the state of the load, if the timing of variation of the output voltage of the three-phase three-level inverter 30 and the timing of variation of the output voltage of the single-phase inverter device 40 do not coincide with each other depending on the polarity of the load current and the timings of the dead times, both variation timings may be controlled so as to coincide with each other. By controlling both variation timings so as to coincide with each other, the output voltage variation width of the inverter can be kept within 1 level per 1 step.

As described above, according to embodiment 2, the same effects as in embodiment 1 are provided. Further, even if the variation timing of output voltage after the dead time is applied to the semiconductor elements composing the three-phase three-level inverter 30 and the variation timing of output voltage after the dead time is applied to the semiconductor elements composing the single-phase inverter device 40 are shifted from each other depending on the state of the load, i.e., the polarity of the load current, both variation timings are controlled so as to coincide with each other, whereby the variation width of the output voltage of the inverter can be kept within 1 level per 1 step. Thus, it is not necessary to provide a noise filter for load change, deterioration in reliability due to the influence of noise can be prevented, and the noise filter connected at the stage subsequent to the power conversion device 3 can be reduced in size and weight. In a case where the power conversion device 3 is mounted to an aircraft, the noise filter can be reduced in size and weight, thus contributing to fuel efficiency improvement.

Embodiment 3

Hereinafter, a power conversion device 3 according to embodiment 3 will be described with reference to the drawings. In the present embodiment 3, the relationship of turn-on times and turn-off times of the semiconductor element composing the three-phase three-level inverter 30 and the semiconductor element composing the single-phase inverter device 40, and the voltage spike of the inverter 10, will be described.

Figure 11A:
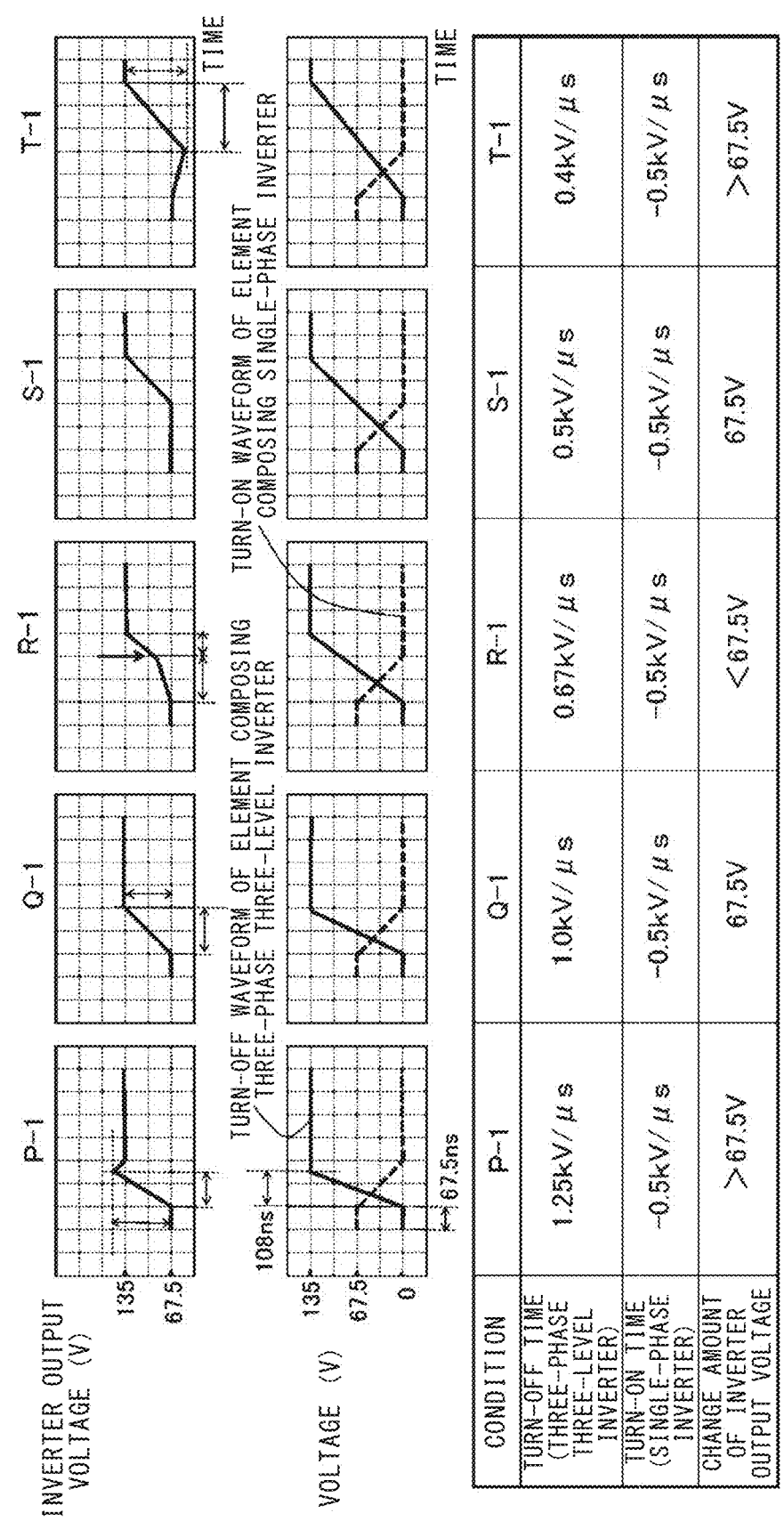
FIG. 11A shows the relationship of turn-off waveforms, turn-on waveforms, and output voltage waveforms of semiconductor elements composing a power conversion device according to embodiment 3.

FIG. 11A shows, from the top, examples of waveforms of the output voltage of the inverter 10 under respective conditions, examples of turn-off waveforms (solid lines) of the semiconductor element composing the three-phase three-level inverter 30 and turn-on waveforms (broken lines) of the semiconductor element composing the single-phase inverter device 40, the respective conditions, and change amounts of the inverter output voltage, all together. Regarding the turn-off waveform of the semiconductor element composing the three-phase three-level inverter 30 and the turn-on waveform of the semiconductor element composing the single-phase inverter device 40 at the second stage from the top, voltage on the vertical axis is the drain-source voltage in a case where the semiconductor element is a MOSFET or the collector-emitter voltage in a case where the semiconductor element is an integrated gate bipolar transistor (IGBT) described later.

FIG. 11B shows, from the top, examples of waveforms of the output voltage of the inverter 10 under respective conditions, examples of turn-on waveforms (solid lines) of the semiconductor element composing the three-phase three-level inverter 30 and turn-off waveforms (broken lines) of the semiconductor element composing the single-phase inverter device 40, the respective conditions, and change amounts of the inverter output voltage, all together. The vertical axis of the graph showing the waveforms at the second stage from the top is the same as in FIG. 11A.

FIG. 11A shows output waveforms of the inverter 10 in a case where the turn-on time (dV/dt) of the semiconductor element composing the single-phase inverter device 40 is −0.5 kV/μs while the turn-off time of the semiconductor element composing the three-phase three-level inverter 30 is changed. Here, the start timings of turning on of the semiconductor element composing the single-phase inverter device 40 and turning off of the semiconductor element composing the three-phase three-level inverter 30 are made to coincide with each other. That is, the start timings of voltage variation of the three-phase three-level inverter 30 and voltage variation of the single-phase inverter device 40 are made to coincide with each other.

The respective conditions are denoted by P-1 to T-1. Variation of the inverter output voltage in the condition Q-1 is kept within 67.5 V (1 level) per 1 step, as indicated by an arrow in FIG. 11A. The same applies to the condition S-1. In the condition R-1, the slope of the waveform of the output voltage changes at a border indicated by an arrow, and thus voltage variation is smaller than 67.5 V (1 level) per 1 step. That is, variation of the inverter output voltage in the conditions Q-1, R-1, S-1 is kept within 67.5 V (1 level) per 1 step.

In the condition P-1 in which the turn-off time of the semiconductor element composing the three-phase three-level inverter 30 is great, the waveform of the inverter output voltage has a voltage spike protruding upward, and variation of the inverter output voltage exceeds 67.5 V per 1 step. Although not shown, in a condition in which the turn-off time of the semiconductor element composing the three-phase three-level inverter 30 is greater than in the condition P-1, the voltage spike becomes greater, and it has been confirmed that, when the turn-off time of the semiconductor element composing the three-phase three-level inverter 30 exceeds 2 kV/μs, variation of the output voltage reaches 1.5 levels per 1 step.

On the other hand, in the condition T-1 in which the turn-off time of the semiconductor element composing the three-phase three-level inverter 30 is small, the waveform of the inverter output voltage has a voltage spike protruding downward, and variation of the inverter output voltage exceeds 67.5 V per 1 step. Although not shown, in a condition in which the turn-off time of the semiconductor element composing the three-phase three-level inverter 30 is smaller than in the condition T-1, the voltage spike becomes greater, and it has been confirmed that, when the turn-off time of the semiconductor element composing the three-phase three-level inverter 30 is smaller than 0.25 kV/μs, variation of the output voltage reaches 1.5 levels per 1 step.

FIG. 11B shows the output waveform of the inverter 10 in a case where the turn-off time (dV/dt) of the semiconductor element composing the single-phase inverter device 40 is 0.5 kV/μs while the turn-on time of the semiconductor element composing the three-phase three-level inverter 30 is changed. Here, the start timings of turning off of the semiconductor element composing the single-phase inverter device 40 and turning on of the semiconductor element composing the three-phase three-level inverter 30 are made to coincide with each other.

The respective conditions are denoted by P-2 to T-2. Variation of the inverter output voltage in the condition Q-2 is kept within 67.5 V (1 level) per 1 step, as indicated by an arrow in FIG. 11B. The same applies to the condition S-2. In the condition R-2, the slope of the waveform of the output voltage changes at a border indicated by an arrow, and thus the voltage variation is smaller than 67.5 V (1 level) per 1 step. That is, variation of the inverter output voltage in the conditions Q-2, R-2, S-2 is kept within 67.5 V (1 level) per 1 step.

In the condition P-2 in which the absolute value of the turn-on time of the semiconductor element composing the three-phase three-level inverter 30 is great, the waveform of the inverter output voltage has a voltage spike protruding downward, and variation of the inverter output voltage exceeds 67.5 V per 1 step. Although not shown, in a condition in which the absolute value of the turn-on time of the semiconductor element composing the three-phase three-level inverter 30 is greater than in the condition P-2, the voltage spike becomes greater, and it has been confirmed that, when the turn-on time of the semiconductor element composing the three-phase three-level inverter 30 exceeds |−2 kV/μs|, variation of the output voltage reaches 1.5 levels per 1 step.

On the other hand, in the condition T-2 in which the absolute value of the turn-on time of the semiconductor element composing the three-phase three-level inverter 30 is small, the waveform of the inverter output voltage has a voltage spike protruding upward, and variation of the inverter output voltage exceeds 67.5 V per 1 step. Although not shown, in a condition in which the turn-off time of the semiconductor element composing the three-phase three-level inverter 30 is smaller than in the condition T-2, the voltage spike becomes greater, and it has been confirmed that, when the absolute value of the turn-off time of the semiconductor element composing the three-phase three-level inverter 30 is smaller than |−0.25 kV/μs|, variation of the output voltage reaches 1.5 levels per 1 step.

From the above, it is found that, even in a case where the start timings of voltage variation of the three-phase three-level inverter 30 and voltage variation of the single-phase inverter device 40 coincide with each other, there is such a relationship of the turn-off times and the turn-on times of the semiconductor element composing the three-phase three-level inverter 30 and the semiconductor element composing the single-phase inverter device 40 that does not cause voltage spike in the output voltage of the inverter 10.

The relationship of the turn-off times and the turn-on times in which the voltage variation width of the output voltage of the inverter 10 can be kept within 1 level per 1 step is as follows.

$$2 \times Y2 \geq X1 \geq Y2 \quad (2)$$

$$2 \times Y1 \geq X2 \geq Y1 \quad (3)$$

Here, Y1 is the absolute value of the turn-off time of the semiconductor element composing the three-phase three-level inverter 30, X2 is the absolute value of the turn-on time of the semiconductor element composing the single-phase inverter device 40, Y2 is the absolute value of the turn-on time of the semiconductor element composing the three-phase three-level inverter 30, and X1 is the absolute value of the turn-off time of the semiconductor element composing the single-phase inverter device 40.

As described above, in the power conversion device 3 according to embodiment 3, the semiconductor element composing the single-phase inverter device 40 and the semiconductor element composing the three-phase three-level inverter 30 satisfy Expression (2) and Expression (3). With this configuration, in a case where the start timings of turning on of the semiconductor element composing the single-phase inverter device 40 and turning off of the semiconductor element composing the three-phase three-level inverter 30 are made to coincide with each other and the start timings of voltage variation of the three-phase three-level inverter 30 and voltage variation of the single-phase inverter device 40 are made to coincide with each other, the voltage variation width of the output voltage of the inverter 10 can be kept within 1 level per 1 step. Thus, the noise filter connected at the stage subsequent to the power conversion device 3 can be reduced in size and weight, whereby fuel efficiency can be improved. In addition, deterioration in reliability due to the influence of noise can be prevented without weight increase.

Embodiment 4

Here, configurations of semiconductor elements composing a power conversion device 3 according to embodiment 4 will be described. According to embodiment 3, even in a case where switching times (turn-on time and turn-off time) of the semiconductor element composing the three-phase three-level inverter 30 and switching times of the semiconductor element composing the single-phase inverter device 40 are made different within the condition range shown by Expression (2) and Expression (3), the output voltage variation width can be kept within 1 level per 1 step. In embodiment 3, the semiconductor elements composing the three-phase three-level inverter 30 and the semiconductor elements composing the single-phase inverter device 40 shown in FIG. 2 are MOSFETS, whereas in the present embodiment 4, other semiconductor elements that can satisfy such switching times as described in embodiment 3 will be described below.

Figure 12A:
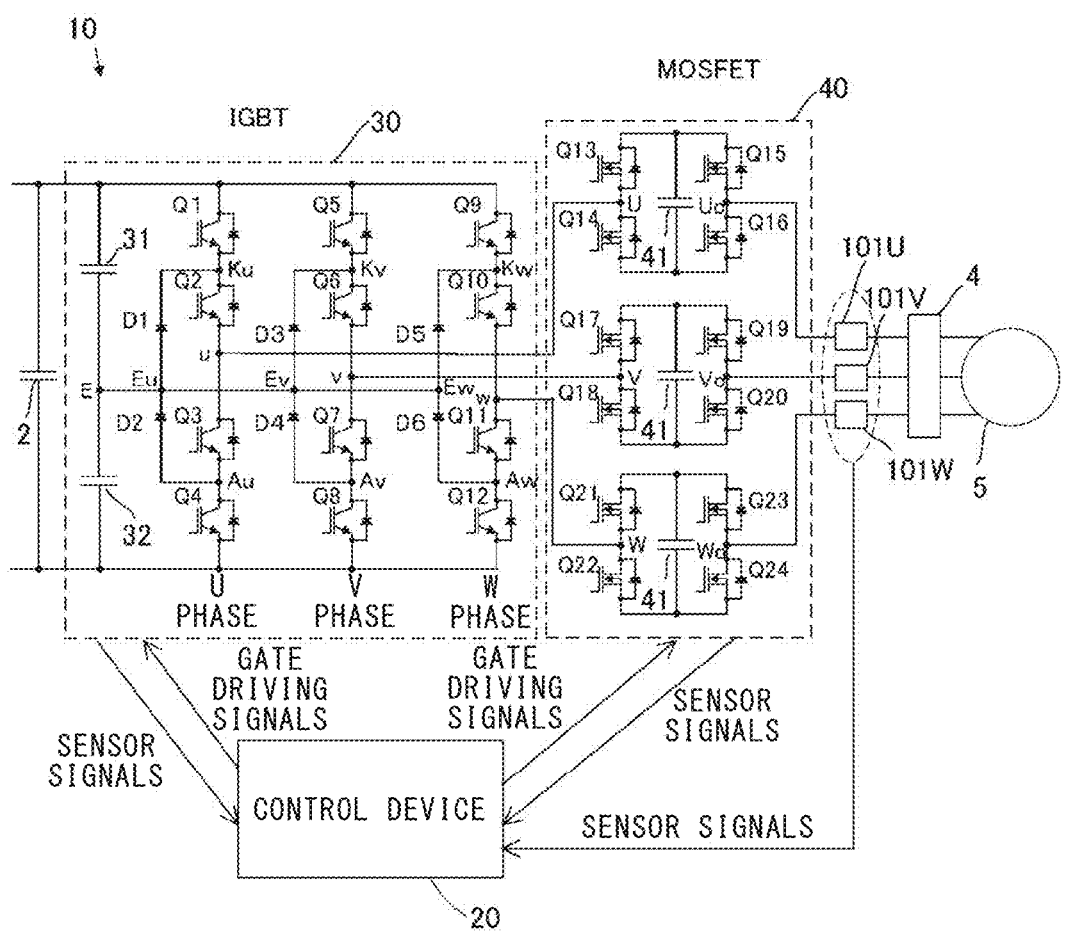
FIG. 12A shows an example of a circuit configuration of a power conversion device according to embodiment 4.

FIG. 12A is a circuit configuration diagram showing an example in which the switching elements Q1 to Q12 composing the three-phase three-level inverter 30 each have a structure in which a diode is connected in antiparallel to an IGBT which is a semiconductor element, and the switching elements Q13 to Q24 composing the single-phase inverter device 40 each have a structure in which a diode is connected in antiparallel to a MOSFET which is a semiconductor element.

Figure 12B:
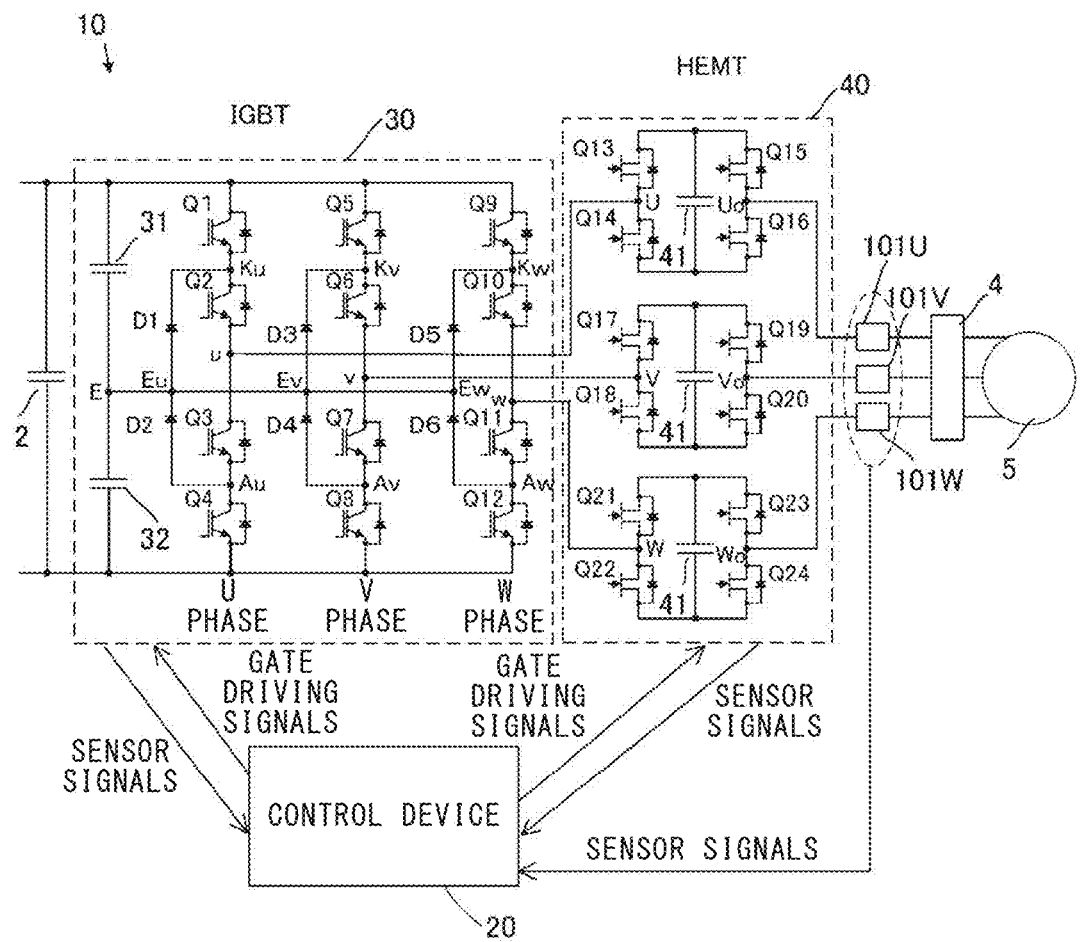
FIG. 12B shows another example of a circuit configuration of the power conversion device according to embodiment 4.

FIG. 12B is a circuit configuration diagram showing an example in which the switching elements Q1 to Q12 composing the three-phase three-level inverter 30 each have a structure in which a diode is connected in antiparallel to an IGBT which is a semiconductor element, and the switching elements Q13 to Q24 composing the single-phase inverter device 40 each have a structure in which a diode is connected in antiparallel to a high electron mobility transistor (HEMT) which is a semiconductor element. The structures of the switching elements Q1 to Q24 composing the three-phase three-level inverter 30 and the single-phase inverter device 40 in FIG. 12A and FIG. 12B will be described with reference to FIG. 13A and FIG. 13B.

Figure 13A:
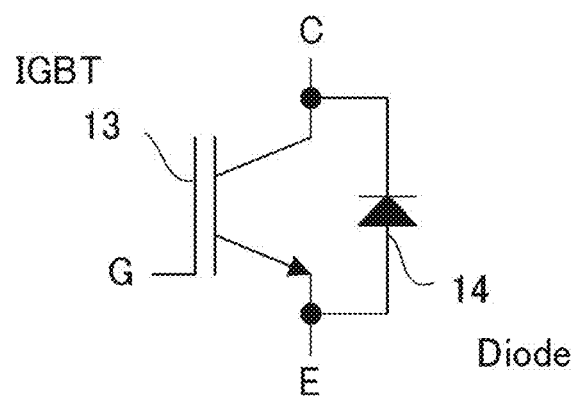
FIG. 13A shows an example of a switching element used in the power conversion device according to embodiment 4.

FIG. 13A shows an example of a configuration of a semiconductor element applied to the switching elements Q1 to Q12 composing the three-phase three-level inverter 30. The semiconductor element is composed of an IGBT 13 having a collector terminal C, a gate terminal G, and an emitter terminal E, and a diode 14 connected in antiparallel thereto. The IGBT 13 may be a Si-IGBT, or, for example, a SiC-IGBT using a wide bandgap semiconductor. The diode 14 may be a Si-diode, or, for example, a SiC-diode using a wide bandgap semiconductor.

Figure 13B:
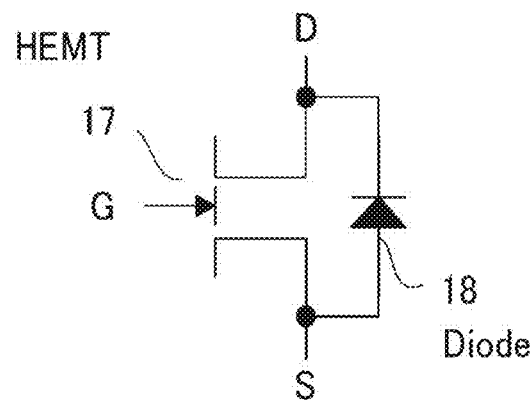
FIG. 13B shows another example of a switching element used in the power conversion device according to embodiment 4.

FIG. 13B shows an example of another configuration of a semiconductor element applied to the switching elements Q13 to Q24 composing the single-phase inverter device 40. The semiconductor element is composed of a HEMT 17 having a drain terminal D, a gate terminal G, and a source terminal S, and a diode 18 connected in antiparallel thereto. The HEMT 17 is, for example, a GaN-HEMT using a wide bandgap semiconductor. The diode 18 may be a Schottky barrier diode, a Si-diode, or, for example, a SiC-diode using a wide bandgap semiconductor. However, a semiconductor element using a wide bandgap semiconductor is desirable.

As described above, in the power conversion device 3 of embodiment 4, the structure in which a diode is connected in antiparallel to an IGBT or the structure in which a diode is connected in antiparallel to a HEMT can be used for semiconductor elements. In a case of using these structures of semiconductor elements, switching times can be set so as to satisfy the condition shown by Expression (2) and Expression (3) in embodiment 3, whereby the same effects as in embodiment 3 are provided.

Embodiment 5

Hereinafter, an aircraft according to embodiment 5 will be described.

Figure 14:
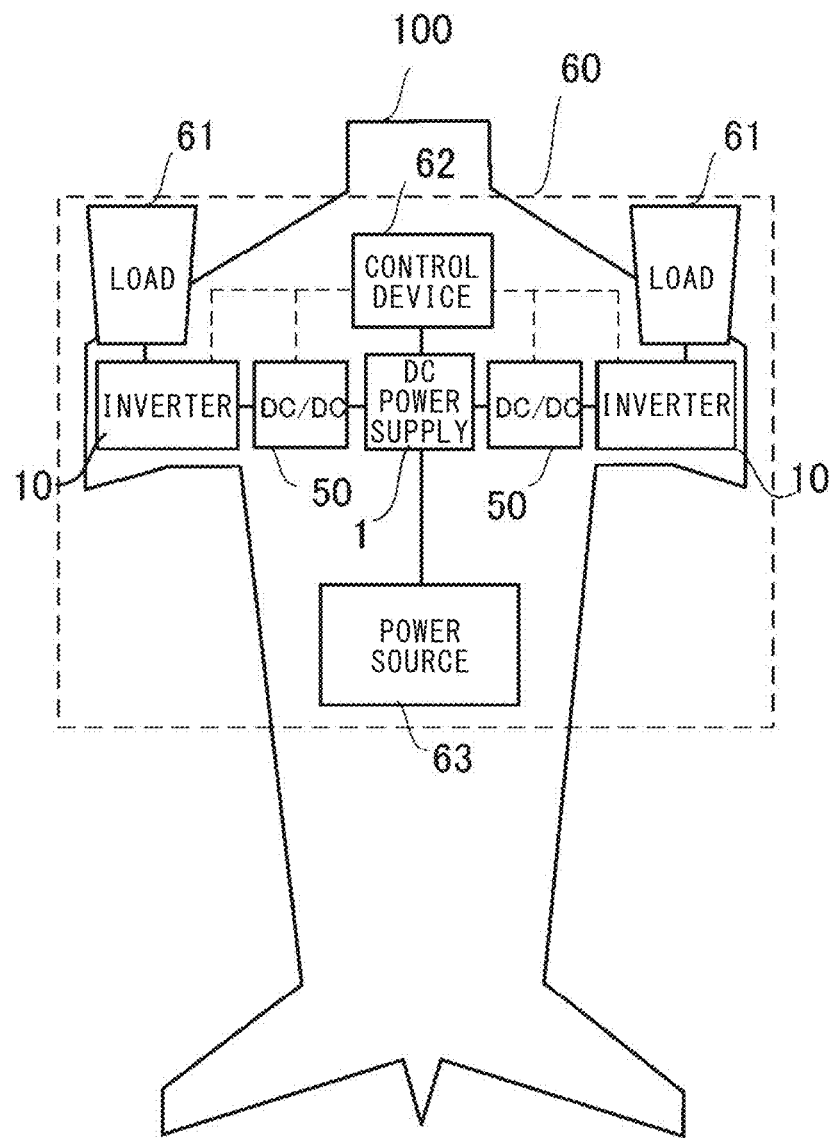
FIG. 14 is a schematic configuration diagram showing an aircraft according to embodiment 5.

FIG. 14 shows an example of an aircraft 100 according to embodiment 5, and is a block diagram showing a state in which the power conversion device described in each of embodiments 1 to 4 is mounted. The aircraft 100 is an electric aircraft, and includes, as a propulsion-related power system 60, a power source 63, the power supply (DC power supply) 1 connected to the power source 63, DC/DC converters 50 connected to the power supply 1 and including step-down chopper circuits for performing conversion to predetermined voltage, the inverters 10 for converting DC powers stepped down by the DC/DC converters 50 to AC powers, loads 61 supplied with powers from the inverters 10, and a control device 62 for controlling the DC/DC converters 50 and the inverters 10. Here, the loads 61 are propulsion-related loads for obtaining propulsion force, and are, for example, electric motors.

The power conversion device of each of embodiments 1 to 4 can be used as the inverter 10 for electric aircraft in the propulsion-related power system 60 mounted to the aircraft 100. Since a device mounted to an object such as an aircraft that flies in the sky is required to be reduced in weight, the power conversion device described in each of embodiments 1 to 4 is mounted to the propulsion-related power system 60 in order to reduce the size and the weight of the noise filter, so that voltage of the inverter 10 for electric aircraft has a waveform with less distortion, whereby the noise filter can be reduced in weight and increase in weight and cost can be suppressed. Thus, fuel efficiency of the electric aircraft is improved.

Embodiment 6

Hereinafter, an aircraft according to embodiment 6 will be described.

Figure 15:
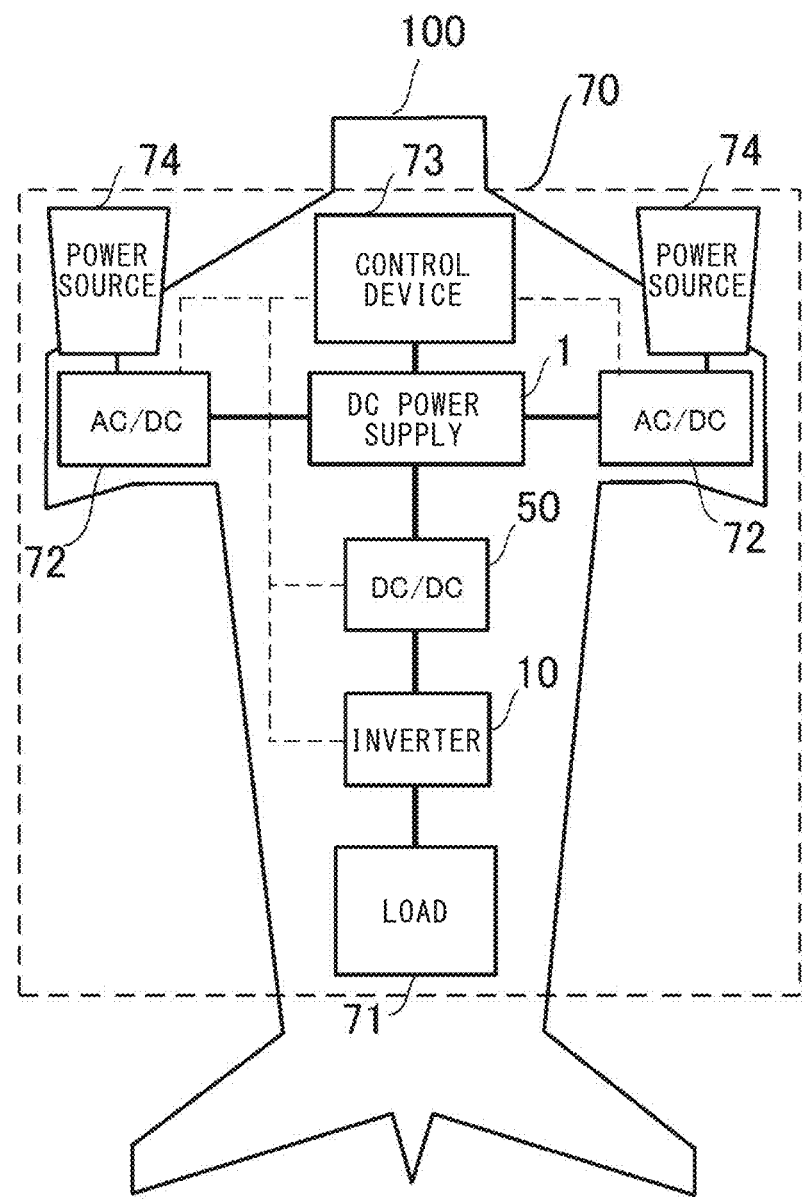
FIG. 15 is a schematic configuration diagram showing an aircraft according to embodiment 6.

FIG. 15 shows an example of an aircraft 100 according to embodiment 6, and is a block diagram showing a state in which the power conversion device described in each of embodiments 1 to 4 is mounted. The aircraft 100 is an electric aircraft, and includes, as an equipment-related power system 70, power sources 74, AC/DC converters 72 which are connected to the power sources 74 and convert AC powers to DC powers, the power supply (DC power supply) 1 connected to the AC/DC converters 72, a DC/DC converter 50 connected to the power supply 1 and including a step-down chopper circuit for performing conversion to predetermined voltage, the inverter 10 for converting DC power stepped down by the DC/DC converter 50 to AC power, a load 71 supplied with power from the inverter 10, and a control device 73 for controlling the DC/DC converter 50, the inverter 10, and the AC/DC converters 72. Here, the load 71 is an equipment-related load, and is, for example, an electric motor or the like used for driving an air conditioning device, an engine starter, or an auxiliary power device.

As in embodiment 5, the power conversion device of each of embodiments 1 to 4 is used as the inverter 10 for electric aircraft in the equipment-related power system 70 mounted to the aircraft 100. Since a device mounted to an object such as an aircraft that flies in the sky is required to be reduced in weight, the power conversion device described in each of embodiments 1 to 4 is mounted to the equipment-related power system 70 in order to reduce the size and the weight of the noise filter, whereby the same effects as in embodiment 5 are provided.

Figure 16:
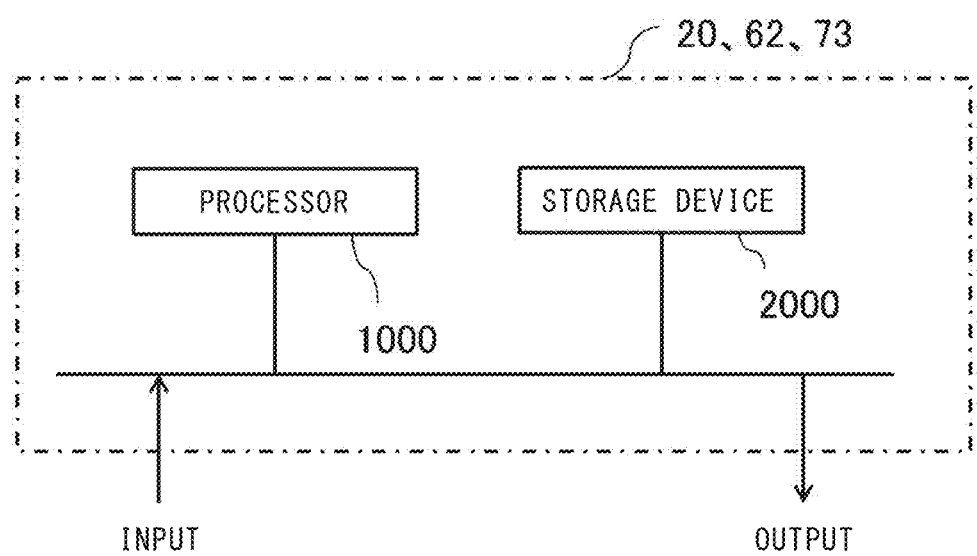
FIG. 16 is a hardware configuration diagram of a control device according to each of embodiments 1 to 6.

In each of the above embodiments 1 to 6, the control device is composed of a processor 1000 and a storage device 2000 as shown in a hardware example in FIG. 16. Although not shown, the storage device is provided with a volatile storage device such as a random access memory and a nonvolatile auxiliary storage device such as a flash memory. Instead of the flash memory, an auxiliary storage device of a hard disk may be provided. The processor 1000 executes a program inputted from the storage device 2000. In this case, the program is inputted from the auxiliary storage device to the processor 1000 via the volatile storage device. The processor 1000 may output data such as a calculation result to the volatile storage device of the storage device 2000, or may store such data into the auxiliary storage device via the volatile storage device.

Other Embodiments

In the above embodiments 1 to 6, the case where one three-phase three-level inverter 30 is provided as the first inverter and the single-phase inverter device 40 as a second inverter has three single-phase inverters, has been shown. However, the configuration is not limited thereto. The first inverter is not limited to a three-phase configuration and may have a single-phase configuration. In a case where the first inverter is one single-phase inverter, the second inverter may be one single-phase inverter.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 power supply
2 DC link capacitor
3 power conversion device
4 filter
5 load
10 inverter
13 IGBT
14 diode
15 MOSFET
16 diode
17 HEMT
18 diode
20 control device
30 three-phase three-level inverter 31 P-side capacitor
32 N-side capacitor
40 single-phase inverter device
41 capacitor
50 DC/DC converter (non-isolated step-down chopper circuit)
60 propulsion-related power system
61 load
62 control device
63 power source
70 equipment-related power system
71 load
72 AC/DC converter
73 control device
74 power source
100 aircraft
101U, 101V, 101W current sensor
1000 processor
2000 storage device

The invention claimed is:

1. A power conversion device which is provided between a power supply and a load and which converts power from the power supply and supplies the converted power to the load, the power conversion device comprising:
a first inverter including a first capacitor composed of a P-side capacitor and an N-side capacitor connected in series, and a plurality of switching elements;
a second inverter including a plurality of switching elements, and a second capacitor to which voltage smaller than voltage applied to the P-side capacitor and smaller than voltage applied to the N-side capacitor is applied; and
a control device which generates driving signals for driving the plurality of switching elements of the first inverter and the plurality of switching elements of the second inverter, wherein
the first inverter is a three-phase inverter and is configured such that, for each phase, a leg formed by connecting a plurality of the switching elements in series and the first capacitor are connected in parallel, and a connection point is provided between the switching element on a P side and the switching element on an N side of each leg,
the second inverter has three bridge circuits corresponding to the respective three phases, the bridge circuit for each phase is configured such that a first connection unit and a second connection unit each formed by connecting two of the switching elements in series and the second capacitor are connected in parallel, a connection point between the two switching elements composing the first connection unit is connected to the connection point of the leg for the corresponding phase of the first inverter, and a connection point between the two switching elements composing the second connection unit is connected to the corresponding phase of the load,
the control device
for each phase, performs control with dead times applied to the plurality of switching elements of the first inverter and the plurality of switching elements of the second inverter,
controls a variation timing of output voltage of the first inverter and a variation timing of output voltage of the second inverter so as to coincide with each other so that a voltage variation width of combined voltage of the output voltage of the first inverter and the output voltage of the second inverter during a dead time period is reduced, and
controls the plurality of switching elements of the first inverter and the plurality of switching elements of the second inverter so as to satisfy the following expressions:

$$2 \times Y2 \geq X1 \geq Y2, \text{ and}$$

$$2 \times Y1 \geq X2 \geq Y1,$$

where Y1 is an absolute value of a turn-off time of each switching element included in the first inverter,
X2 is an absolute value of a turn-on time of each switching element included in the second inverter,
Y2 is an absolute value of a turn-on time of each switching element included in the first inverter, and
X1 is an absolute value of a turn-off time of each switching element included in the second inverter.

2. The power conversion device according to claim 1, wherein
the control device performs control so that the variation timing of the output voltage of the first inverter and the variation timing of the output voltage of the second inverter coincide with each other, on the basis of a polarity of load current.

3. The power conversion device according to claim 1, wherein
the control device drives the first inverter with a driving frequency lower than that for the second inverter.

4. The power conversion device according to claim 3, wherein
the plurality of switching elements of the first inverter and the plurality of switching elements of the second inverter each include a semiconductor element, the plurality of switching elements of the first inverter are formed of a Si semiconductor, and the plurality of switching elements of the second inverter are formed of a wide bandgap semiconductor.

5. An aircraft comprising the power conversion device according to claim 1.

6. The power conversion device according to claim 2, wherein
the control device drives the first inverter with a driving frequency lower than that for the second inverter.

7. The power conversion device according to claim 6, wherein
the plurality of switching elements of the first inverter and the plurality of switching elements of the second inverter each include a semiconductor element, the plurality of switching elements of the first inverter are formed of a Si semiconductor, and the plurality of switching elements of the second inverter are formed of a wide bandgap semiconductor.

8. An aircraft comprising the power conversion device according to claim 2.

9. An aircraft comprising the power conversion device according to claim 3.

10. An aircraft comprising the power conversion device according to claim 4.

11. An aircraft comprising the power conversion device according to claim 6.

12. An aircraft comprising the power conversion device according to claim 7.

* * * * *